United States Patent
Sarwer et al.

(10) Patent No.: US 11,523,138 B2
(45) Date of Patent: Dec. 6, 2022

(54) METHOD AND APPARATUS FOR CROSS COMPONENT FILTERING

(71) Applicant: ALIBABA GROUP HOLDING LIMITED, Grand Cayman (KY)

(72) Inventors: Mohammed Golam Sarwer, Cupertino, CA (US); Jiancong Luo, Skillman, NJ (US); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/214,126

(22) Filed: Mar. 26, 2021

(65) Prior Publication Data
US 2021/0306673 A1    Sep. 30, 2021

Related U.S. Application Data

(60) Provisional application No. 63/000,451, filed on Mar. 26, 2020.

(51) Int. Cl.
*H04N 19/82* (2014.01)
*H04N 19/186* (2014.01)

(52) U.S. Cl.
CPC ........... *H04N 19/82* (2014.11); *H04N 19/186* (2014.11)

(58) Field of Classification Search
CPC .............................. H04N 19/82; H04N 19/186
USPC .................................................. 375/240.02
See application file for complete search history.

(56) References Cited

U.S. PATENT DOCUMENTS

| | | | |
|---|---|---|---|
| 9,648,332 B2 | 5/2017 | Kim et al. | |
| 2014/0219347 A1 | 8/2014 | Xu et al. | |
| 2014/0321529 A1 | 10/2014 | Jung et al. | |
| 2016/0241880 A1* | 8/2016 | Chao | H04N 19/86 |
| 2020/0021822 A1* | 1/2020 | An | H04N 19/176 |
| 2021/0084295 A1* | 3/2021 | Chen | H04N 19/117 |
| 2021/0235078 A1* | 7/2021 | Hu | H04N 19/132 |

OTHER PUBLICATIONS

Andersson et al., "Fix for ALF virtual boundary processing," JVET-Q0150, 17th Meeting: Brussels, BE, Jan. 7-17, 2020, 8 pages.
Bross et al., "Versatile Video Coding (Draft 8)," JVET-Q2001-vD, 17th Meeting: Brussels, BE, Jan. 7-17, 2020, 509 pages.
Chen et al., "Algorithm Description of Joint Exploration Test Model 7 (JEM 7)," JVET-G1001-v1, 7th Meeting: Torino, IT, Jul. 13-21, 2017, 50 pages.
Chen et al., "Algorithm Description of Joint Exploration Test Model 8 (JEM 8)," JVET-Q2002-v1, 17th Meeting: Brussels, BE, Jan. 7-17, 2020, 91 pages.

(Continued)

*Primary Examiner* — Amir Shahnami
(74) *Attorney, Agent, or Firm* — Finnegan, Henderson, Farabow, Garrett & Dunner, LLP

(57) ABSTRACT

Methods and apparatuses for video processing include: filtering a luma sample using a first filter in a video coding process, the first filter being represented as a cross shape; filtering a chroma sample associated with the luma sample using a second filter in the video coding process; determining, based on the filtered luma sample, a residual correction value corresponding to the chroma sample; and determining a corrected chroma sample based on the residual correction value and the filtered chroma sample.

20 Claims, 37 Drawing Sheets

200A

(56) References Cited

OTHER PUBLICATIONS

International Telecommunications Union "Series H: Audiovisual and Multimedia Systems Infrastructure of audiovisual services—Coding of moving video", ITU-T Telecommunication Standardization Sector of ITU, Apr. 2013, 317 pages.
JEM, https://ivet.hhi.fraunhofer.de/svn/svn_HMJEMSoftware.
Li et al., CE5-2.2: Multiplication removal for CCALF with coefficient range in [-8, 8], JVET-Q0095, 17$^{th}$ Meeting: Brussels, BE, Jan. 7-17, 2020, 4 pages.
Segall et al., "Joint Call for Proposals on Video Compression with Capability beyond HEVC," JVET-H1002 (v6), 8$^{th}$ Meeting: Macao, CN, Oct. 18-24, 2017, 27 pages.
Sullivan et al., "Overview of the High Efficiency Video Coding (HEVC) Standard," IEE Transactions on Circuits and Systems for Video Technology, vol. 22, No. 12, pp. 1649-1668 (2012).
PCT International Search Report and Written Opinion dated Jul. 1, 2021, issued in corresponding International Application No. PCT/US2021/024366 (7 pgs ).

* cited by examiner

8.8.5.7 Cross-component filtering process

Inputs of this process are:
- a reconstructed luma picture sample array recPicture$_L$, prior to the luma adaptive loop filtering process,
- a filtered reconstructed chroma picture sample array alfPicture$_C$,
- a chroma location ( xCtbC, yCtbC ) specifying the top-left sample of the current chroma coding tree block relative to the top-left sample of the current picture,
- a CTB width ccAlfWidth in chroma samples,
- a CTB height ccAlfHeight in chroma samples,
- cross-component filter coefficients CcAlfCoeff[ j ], with j = 0..6.

Output of this process is the modified filtered reconstructed chroma picture sample array ccAlfPicture.

..................

- The vertical sample position offsets yP1 and yP2 are specified in Table 47 according to the vertical luma sample position ( y * subHeightC ) and applyAlfLineBufBoundary.
  - The variable curr is derived as follows:

curr = alfPicture$_C$[ xCtbC + x ][ yCtbC + y ]   (1530)
  - The array of cross-component filter coefficients f[ j ] is derived as follows with j = 0..6:

f[ j ] = CcAlfCoeff[ j ]   (1531)
  - The variable sum is derived as follows:

$$
\begin{aligned}
\text{sum} = &\ \cancel{f[0] * ( \text{recPicture}_L[ h_x ][ v_y{-}yP_1 ] - \text{recPicture}_L[ h_x ][ v_y ] ) +} \\
&\ \cancel{f[1] * ( \text{recPicture}_L[ h_{x{-}1} ][ v_y ] - \text{recPicture}_L[ h_x ][ v_y ] ) +} \\
&\ \cancel{f[2] * ( \text{recPicture}_L[ h_{x{+}1} ][ v_y ] - \text{recPicture}_L[ h_x ][ v_y ] ) +} \\
&\ \cancel{f[3] * ( \text{recPicture}_L[ h_{x{-}1} ][ v_{y{+}P_1} ] - \text{recPicture}_L[ h_x ][ v_y ] ) +} \\
&\ \cancel{f[4] * ( \text{recPicture}_L[ h_x ][ v_{y{+}P_1} ] - \text{recPicture}_L[ h_x ][ v_y ] ) +} \\
&\ \cancel{f[5] * ( \text{recPicture}_L[ h_{x{+}1} ][ v_{y{+}P_1} ] - \text{recPicture}_L[ h_x ][ v_y ] ) +} \\
&\ \cancel{f[6] * ( \text{recPicture}_L[ h_x ][ v_{y{+}P_2} ] - \text{recPicture}_L[ h_x ][ v_y ] )}
\end{aligned}
\quad\text{— 802}
$$

$$
\begin{aligned}
\text{sum} = &\ f[0] * ( \text{recPicture}_L[ h_x ][ v_{y{-}yP1} ] - \text{recPicture}_L[ h_x ][ v_y ] ) + \\
&\ f[1] * ( \text{recPicture}_L[ h_{x{-}2} ][ v_y ] - \text{recPicture}_L[ h_x ][ v_y ] ) + \\
&\ f[2] * ( \text{recPicture}_L[ h_{x{-}1} ][ v_y ] - \text{recPicture}_L[ h_x ][ v_y ] ) + \\
&\ f[3] * ( \text{recPicture}_L[ h_{x{+}1} ][ v_y ] - \text{recPicture}_L[ h_x ][ v_y ] ) + \\
&\ f[4] * ( \text{recPicture}_L[ h_{x{+}2} ][ v_y ] - \text{recPicture}_L[ h_x ][ v_y ] ) + \\
&\ f[5] * ( \text{recPicture}_L[ h_x ][ v_{y{+}yP1} ] - \text{recPicture}_L[ h_x ][ v_y ] ) + \\
&\ f[6] * ( \text{recPicture}_L[ h_x ][ v_{y{+}yP2} ] - \text{recPicture}_L[ h_x ][ v_y ] )
\end{aligned}
$$

scaledSum = Clip3( −( 1 << ( BitDepth − 1 ) ), ( 1 << ( BitDepth − 1 ) ) − 1, ( sum + 64 ) >> 7)   (1533)

sum = curr + scaledSum   (1534)

- The modified filtered reconstructed chroma picture sample ccAlfPicture[ xCtbC + x ][ yCtbC + y ] is derived as follows:

ccAlfPicture[ xCtbC + x ][ yCtbC + y ] = Clip3( 0, ( 1 << BitDepth ) − 1, sum )   (1535)

FIG. 8

Table 1: ALF Data Syntax for Signaling Filter Coefficients

| 1 | alf_data( ) { | Descriptor |
|---|---|---|
| 2 |   if( alf_cc_cb_filter_signal_flag ) { | |
| 3 |     alf_cc_cb_filters_signalled_minus1 | ue(v) |
| 4 |     for( k = 0; k < alf_cc_cb_filters_signalled_minus1 + 1; k++ ) { | |
| 5 |       for( j = 0; j < ~~7~~ 8; j++ ) { | |
| 6 | 1002     alf_cc_cb_mapped_coeff_abs[ k ][ j ] | u(3) |
| 7 |         if( alf_cc_cb_mapped_coeff_abs[ k ][ j ] ) | |
| 8 |           alf_cc_cb_coeff_sign[ k ][ j ] | u(1) |
| 9 |       } | |
| 10 |     } | |
| 11 |   } | |
| 12 |   if( alf_cc_cr_filter_signal_flag ) { | |
| 13 |     alf_cc_cr_filters_signalled_minus1 | ue(v) |
| 14 |     for( k = 0; k < alf_cc_cr_filters_signalled_minus1 + 1; k++ ) { | |
| 15 |       for( j = 0; j < ~~7~~ 8; j++ ) { | |
| 16 | 1004     alf_cc_cr_mapped_coeff_abs[ k ][ j ] | u(3) |
| 17 |         if( alf_cc_cr_mapped_coeff_abs[ k ][ j ] ) | |
| 18 |           alf_cc_cr_coeff_sign[ k ][ j ] | u(1) |
| 19 |       } | |
| 20 |     } | |
| 21 |   } | |
| 22 | } | |

FIG. 10

8.8.5.7 Cross-component filtering process

Inputs of this process are:
- a reconstructed luma picture sample array recPicture$_L$ prior to the luma adaptive loop filtering process,
- a filtered reconstructed chroma picture sample array alfPicture$_C$,
- a chroma location ( xCtbC, yCtbC ) specifying the top-left sample of the current chroma coding tree block relative to the top-left sample of the current picture,
- a CTB width ccAlfWidth in chroma samples,
- a CTB height ccAlfHeight in chroma samples,
- cross-component filter coefficients CcAlfCoeff[ j ], with j = 0... ~~6~~ 7. ← 1102

Output of this process is the modified filtered reconstructed chroma picture sample array ccAlfPicture.
..................

- The vertical sample position offsets yP1 and yP2 are specified in Table 47 according to the vertical luma sample position (y * subHeightC) and applyAlfLineBufBoundary.
- The variable curr is derived as follows:
  curr = alfPicture$_C$[ xCtbC + x ][ yCtbC + y ]     ← 1104     (1530)
- The array of cross-component filter coefficients f[ j ] is derived as follows with j = 0... ~~6~~ 7:
  f[ j ] = CcAlfCoeff[ j ]     (1531)
- The variable sum is derived as follows:

~~sum = f[ 0 ] * ( recPicture$_L$[ h$_x$ ][ v$_y$ $_-$ $_{yP1}$ ] − recPicture$_L$[ h$_x$ ][ v$_y$ ] ) +~~
~~f[ 1 ] * ( recPicture$_L$[ h$_{x-1}$ ][ v$_y$ ] − recPicture$_L$[ h$_x$ ][ v$_y$ ] ) +~~
~~f[ 2 ] * ( recPicture$_L$[ h$_{x+1}$ ][ v$_y$ ] − recPicture$_L$[ h$_x$ ][ v$_y$ ] ) +~~
~~f[ 3 ] * ( recPicture$_L$[ h$_{x-1}$ ][ v$_{y+yP1}$ ] − recPicture$_L$[ h$_x$ ][ v$_y$ ] ) +~~
~~f[ 4 ] * ( recPicture$_L$[ h$_x$ ][ v$_{y+yP1}$ ] − recPicture$_L$[ h$_x$ ][ v$_y$ ] ) +~~
~~f[ 5 ] * ( recPicture$_L$[ h$_{x+1}$ ][ v$_{y+yP1}$ ] − recPicture$_L$[ h$_x$ ][ v$_y$ ] ) +~~
~~f[ 6 ] * ( recPicture$_L$[ h$_x$ ][ v$_{y+yP2}$ ] − recPicture$_L$[ h$_x$ ][ v$_y$ ] )~~     ← 1106

$$\begin{aligned}
sum = \ & f[0] * (recPicture_L[h_x][v_{y-yP2}] - recPicture_L[h_x][v_y]) + \\
& f[1] * (recPicture_L[h_x][v_{y-yP1}] - recPicture_L[h_x][v_y]) + \\
& f[2] * (recPicture_L[h_{x-2}][v_y] - recPicture_L[h_x][v_y]) + \\
& f[3] * (recPicture_L[h_{x-1}][v_y] - recPicture_L[h_x][v_y]) + \\
& f[4] * (recPicture_L[h_{x+1}][v_y] - recPicture_L[h_x][v_y]) + \\
& f[5] * (recPicture_L[h_{x+2}][v_y] - recPicture_L[h_x][v_y]) + \\
& f[6] * (recPicture_L[h_x][v_{y+yP1}] - recPicture_L[h_x][v_y]) + \\
& f[7] * (recPicture_L[h_x][v_{y+yP2}] - recPicture_L[h_x][v_y])
\end{aligned}$$

scaledSum = Clip3( −( 1 << ( BitDepth − 1 ) ), ( 1 << ( BitDepth − 1 ) ) − 1, ( sum + 64 ) >> 7 )     (1533)

sum = curr + scaledSum     (1534)

- The modified filtered reconstructed chroma picture sample ccAlfPicture[ xCtbC + x ][ yCtbC + y ] is derived as follows:

ccAlfPicture[ xCtbC + x ][ yCtbC + y ] = Clip3( 0, ( 1 << BitDepth ) − 1, sum )     (1535)

FIG. 11

Table 2: Specification of yP1 and yP2 Associated with 9-Tap 5×5 Cross-Shape Filter

| 1 | Condition | yP1 | yP2 |
|---|---|---|---|
| 2 | ( y * subHeightC == CtbSizeY − 5 \|\| y * subHeightC == CtbSizeY − 4 ) && applyAlfLineBufBoundary == 1 | 0 | 0 |
| 3 | ( y * subHeightC == CtbSizeY − 6 \|\| y * subHeightC == CtbSizeY − 3 \|\| *y * subHeightC == CtbSizeY − 2* ) && applyAlfLineBufBoundary == 1 | 1 | 1 |
| 4 | Otherwise | 1 | 2 |

FIG. 12

Table 3: ALF Data Syntax for Signaling Filter Coefficients

| 1 | alf_data( ) { | Descriptor |
|---|---|---|
| 2 |   if( alf_cc_cb_filter_signal_flag ) { | |
| 3 |     alf_cc_cb_filters_signalled_minus1 | ue(v) |
| 4 |     for( k = 0; k < alf_cc_cb_filters_signalled_minus1 + 1; k++ ) { | |
| 5 |       for( j = 0; j < [~~7~~ \| *12*; j++ ) { | |
| 6 | 1402         alf_cc_cb_mapped_coeff_abs[ k ][ j ] | u(3) |
| 7 |         if( alf_cc_cb_mapped_coeff_abs[ k ][ j ] ) | |
| 8 |           alf_cc_cb_coeff_sign[ k ][ j ] | u(1) |
| 9 |       } | |
| 10 |     } | |
| 11 |   } | |
| 12 |   if( alf_cc_cr_filter_signal_flag ) { | |
| 13 |     alf_cc_cr_filters_signalled_minus1 | ue(v) |
| 14 |     for( k = 0; k < alf_cc_cr_filters_signalled_minus1 + 1; k++ ) { | |
| 15 |       for( j = 0; j < [~~7~~ \| *12*; j++ ) { | |
| 16 | 1404         alf_cc_cr_mapped_coeff_abs[ k ][ j ] | u(3) |
| 17 |         if( alf_cc_cr_mapped_coeff_abs[ k ][ j ] ) | |
| 18 |           alf_cc_cr_coeff_sign[ k ][ j ] | u(1) |
| 19 |       } | |
| 20 |     } | |
| 21 |   } | |
| 22 | } | |

FIG. 14

8.8.5.7 Cross-component filtering process

Inputs of this process are:
- a reconstructed luma picture sample array recPicture$_L$ prior to the luma adaptive loop filtering process,
- a filtered reconstructed chroma picture sample array alfPicture$_C$,
- a chroma location ( xCtbC, yCtbC ) specifying the top-left sample of the current chroma coding tree block relative to the top-left sample of the current picture,
- a CTB width ccAlfWidth in chroma samples,
- a CTB height ccAlfHeight in chroma samples,
- cross-component filter coefficients CcAlfCoeff[ j ], with j = 0 ... ~~5~~ _11_.  ⟵ 1502

Output of this process is the modified filtered reconstructed chroma picture sample array ccAlfPicture.

...............

- The vertical sample position offsets ~~yP1 and yP2~~ _yP1, yP2, and yP3_ are specified in Table 47 according to the vertical luma sample position (y * subHeightC) and applyAlfLineBufBoundary.   ⟵ 1508
- The variable curr is derived as follows:
    curr = alfPicture$_C$[ xCtbC + x][ yCtbC + y ]    ⟵ 1504  (1530)
- The array of cross-component filter coefficients f[ j ] is derived as follows with j = 0 ... ~~5~~ _11_:
    f[ j ] = CcAlfCoeff[ j ]                                                                (1531)
- The variable sum is derived as follows:

~~sum =  f[ 0 ] * ( recPicture$_L$[ h$_x$ ][ v$_y$ − yP1 ] − recPicture$_L$[ h$_x$ ][ v$_y$ ] ) +~~
~~f[ 1 ] * ( recPicture$_L$[ h$_{x-1}$ ][ v$_y$ ] − recPicture$_L$[ h$_x$ ][ v$_y$ ] ) +~~
~~f[ 2 ] * ( recPicture$_L$[ h$_{x+1}$ ][ v$_y$ ] − recPicture$_L$[ h$_x$ ][ v$_y$ ] ) +~~
~~f[ 3 ] * ( recPicture$_L$[ h$_{x-1}$ ][ v$_{y+yP1}$ ] − recPicture$_L$[ h$_x$ ][ v$_y$ ] ) +~~
~~f[ 4 ] * ( recPicture$_L$[ h$_x$ ][ v$_{y+yP1}$ ] − recPicture$_L$[ h$_x$ ][ v$_y$ ] ) +~~
~~f[ 5 ] * ( recPicture$_L$[ h$_{x+1}$ ][ v$_{y+yP1}$ ] − recPicture$_L$[ h$_x$ ][ v$_y$ ] ) +~~
~~f[ 6 ] * ( recPicture$_L$[ h$_x$ ][ v$_{y+yP2}$ ] − recPicture$_L$[ h$_x$ ][ v$_y$ ] )~~      ⟵ 1506

- sum =  f[ 0 ] * ( recPicture$_L$[ h$_x$ ][ v$_{y-yP3}$ ] − recPicture$_L$[ h$_x$ ][ v$_y$ ] ) +
    f[ 1 ] * ( recPicture$_L$[ h$_x$ ][ v$_{y-yP2}$ ] − recPicture$_L$[ h$_x$ ][ v$_y$ ] ) +
    f[ 2 ] * ( recPicture$_L$[ h$_x$ ][ v$_{y-yP1}$ ] − recPicture$_L$[ h$_x$ ][ v$_y$ ] ) +
    f[ 3 ] * ( recPicture$_L$[ h$_{x-3}$ ][ v$_y$ ] − recPicture$_L$[ h$_x$ ][ v$_y$ ] ) +
    f[ 4 ] * ( recPicture$_L$[ h$_{x-2}$ ][ v$_y$ ] − recPicture$_L$[ h$_x$ ][ v$_y$ ] ) +
    f[ 5 ] * ( recPicture$_L$[ h$_{x-1}$ ][ v$_y$ ] − recPicture$_L$[ h$_x$ ][ v$_y$ ] ) +
    f[ 6 ] * ( recPicture$_L$[ h$_{x+1}$ ][ v$_y$ ] − recPicture$_L$[ h$_x$ ][ v$_y$ ] ) +
    f[ 7 ] * ( recPicture$_L$[ h$_{x+2}$ ][ v$_y$ ] − recPicture$_L$[ h$_x$ ][ v$_y$ ] ) +
    f[ 8 ] * ( recPicture$_L$[ h$_{x+3}$ ][ v$_y$ ] − recPicture$_L$[ h$_x$ ][ v$_y$ ] ) +
    f[ 9 ] * ( recPicture$_L$[ h$_x$ ][ v$_{y+yP1}$ ] − recPicture$_L$[ h$_x$ ][ v$_y$ ] ) +
    f[ 10 ] * ( recPicture$_L$[ h$_x$ ][ v$_{y+yP2}$ ] − recPicture$_L$[ h$_x$ ][ v$_y$ ] )+
    f[ 11 ] * ( recPicture$_L$[ h$_x$ ][ v$_{y+yP3}$ ] − recPicture$_L$[ h$_x$ ][ v$_y$ ] )

scaledSum = Clip3( −( 1 << ( BitDepth − 1 ) ), ( 1 << ( BitDepth − 1 ) ) − 1, ( sum + 64 ) >> 7)    (1533)
    sum = curr + scaledSum                                                                              (1534)

- The modified filtered reconstructed chroma picture sample ccAlfPicture[ xCtbC + x ][ yCtbC + y ] is derived as follows:
    ccAlfPicture[ xCtbC + x ][ yCtbC + y ] = Clip3( 0, ( 1 << BitDepth ) − 1, sum )                     (1535)

FIG. 15

Table 4: Specification of yP1, yP2, and yP3 Associated with 13-tap 7×7 Cross-Shape Filter

| 1 | Condition | yP1 | yP2 | yP3 |
|---|---|---|---|---|
| 2 | ( y * subHeightC == CtbSizeY − 5 \|\| y * subHeightC == CtbSizeY − 4 ) && applyAlfLineBufBoundary == 1 | 0 | 0 | 0 |
| 3 | ( y * subHeightC == CtbSizeY − 6 \|\| y * subHeightC == CtbSizeY − 3 ) && applyAlfLineBufBoundary == 1 | 1 | 1 | 1 |
| 4 | (y * subHeightC == CtbSizeY − 7 \|\| y * subHeightC == CtbSizeY − 2) && (applyAlfLineBufBoundary == 1) | 1 | 2 | 2 |
| 5 | Otherwise | 1 | 2 | 3 |

FIG. 16

Table 5: ALF Data Syntax for Signaling Filter Coefficients

| 1 | alf_data( ) { | Descriptor |
|---|---|---|
| 2 |   if( alf_cc_cb_filter_signal_flag ) { | |
| 3 |     alf_cc_cb_filters_signalled_minus1 | ue(v) |
| 4 |     for( k = 0; k < alf_cc_cb_filters_signalled_minus1 + 1; k++ ) { | |
| 5 |       for( j = 0; j < ~~7~~ 6; j++ ) { | |
| 6 | 1802     alf_cc_cb_mapped_coeff_abs[ k ][ j ] | u(3) |
| 7 |         if( alf_cc_cb_mapped_coeff_abs[ k ][ j ] ) | |
| 8 |           alf_cc_cb_coeff_sign[ k ][ j ] | u(1) |
| 9 |       } | |
| 10 |     } | |
| 11 |   } | |
| 12 |   if( alf_cc_cr_filter_signal_flag ) { | |
| 13 |     alf_cc_cr_filters_signalled_minus1 | ue(v) |
| 14 |     for( k = 0; k < alf_cc_cr_filters_signalled_minus1 + 1; k++ ) { | |
| 15 |       for( j = 0; j < ~~7~~ 6; j++ ) { | |
| 16 | 1804     alf_cc_cr_mapped_coeff_abs[ k ][ j ] | u(3) |
| 17 |         if( alf_cc_cr_mapped_coeff_abs[ k ][ j ] ) | |
| 18 |           alf_cc_cr_coeff_sign[ k ][ j ] | u(1) |
| 19 |       } | |
| 20 |     } | |
| 21 |   } | |
| 22 | } | |

FIG. 18

8.8.5.7 Cross-component filtering process

Inputs of this process are:
- a reconstructed luma picture sample array $recPicture_L$ prior to the luma adaptive loop filtering process,
- a filtered reconstructed chroma picture sample array $alfPicture_C$,
- a chroma location ( xCtbC, yCtbC ) specifying the top-left sample of the current chroma coding tree block relative to the top-left sample of the current picture,
- a CTB width ccAlfWidth in chroma samples,
- a CTB height ccAlfHeight in chroma samples,
- cross-component filter coefficients CcAlfCoeff[ j ], with j = 0..6.

Output of this process is the modified filtered reconstructed chroma picture sample array ccAlfPicture.

- The vertical sample position offsets yP1 ~~and yP2~~ are specified in Table 47 according to the vertical luma sample position (y * subHeightC) and ~~apply~~ AlfLineBufBoundary.  ← 1902
- The variable curr is derived as follows:
    $curr = alfPicture_C[\ xCtbC + x\ ][\ yCtbC + y\ ]$     (1530)
- The array of cross-component filter coefficients f[ j ] is derived as follows with j = 0..6:
    $f[\ j\ ] = CcAlfCoeff[\ j\ ]$     (1531)
- The variable sum is derived as follows:

~~sum = f[0] * ( recPicture_L[ h_x ][ v_{y-yP1} ] − recPicture_L[ h_x ][ v_y ] ) +~~
~~f[1] * ( recPicture_L[ h_{x-1} ][ v_y ] − recPicture_L[ h_x ][ v_y ] ) +~~
~~f[2] * ( recPicture_L[ h_{x+1} ][ v_y ] − recPicture_L[ h_x ][ v_y ] ) +~~
~~f[3] * ( recPicture_L[ h_{x-1} ][ v_{y+yP1} ] − recPicture_L[ h_x ][ v_y ] ) +~~
~~f[4] * ( recPicture_L[ h_x ][ v_{y+yP1} ] − recPicture_L[ h_x ][ v_y ] ) +~~
~~f[5] * ( recPicture_L[ h_{x+1} ][ v_{y+yP1} ] − recPicture_L[ h_x ][ v_y ] ) +~~
~~f[6] * ( recPicture_L[ h_x ][ v_{y+yP2} ] − recPicture_L[ h_x ][ v_y ] )~~     ← 1904

$$\begin{aligned}
sum = &\ f[0] * (\ recPicture_L[\ h_x\ ][\ v_{y-yP1}\ ] - recPicture_L[\ h_x\ ][\ v_y\ ]\ ) + \\
&\ f[1] * (\ recPicture_L[\ h_{x-2}\ ][\ v_y\ ] - recPicture_L[\ h_x\ ][\ v_y\ ]\ ) + \\
&\ f[2] * (\ recPicture_L[\ h_{x-1}\ ][\ v_y\ ] - recPicture_L[\ h_x\ ][\ v_y\ ]\ ) + \\
&\ f[3] * (\ recPicture_L[\ h_{x+1}\ ][\ v_y\ ] - recPicture_L[\ h_x\ ][\ v_y\ ]\ ) + \\
&\ f[4] * (\ recPicture_L[\ h_{x+2}\ ][\ v_y\ ] - recPicture_L[\ h_x\ ][\ v_y\ ]\ ) + \\
&\ f[5] * (\ recPicture_L[\ h_x\ ][\ v_{y+yP1}\ ] - recPicture_L[\ h_x\ ][\ v_y\ ]\ )
\end{aligned}$$

$scaledSum = Clip3(\ -(\ 1 << (\ BitDepth - 1\ )\ ),\ (\ 1 << (\ BitDepth - 1\ )\ ) - 1,\ (\ sum + 64\ ) >> 7)$     (1533)

$sum = curr + scaledSum$     (1534)

- The modified filtered reconstructed chroma picture sample ccAlfPicture[ xCtbC + x ][ yCtbC + y ] is derived as follows:
    $ccAlfPicture[\ xCtbC + x\ ][\ yCtbC + y\ ] = Clip3(\ 0,\ (\ 1 << BitDepth\ ) - 1,\ sum\ )$     (1535)

FIG. 19

Table 6: Specification of yP1 Associated with 7-tap 5×3 Cross-Shape Filter

| 1 | Condition | yP1 | yP2 |
|---|---|---|---|
| 2 | ( y * subHeightC == CtbSizeY − 5 \|\| y * subHeightC == CtbSizeY − 4 ) && applyAlfLineBufBoundary == 1 | 0 | 0 |
| 3 | ~~( y * subHeightC == CtbSizeY − 6 \|\| y * subHeightC == CtbSizeY − 3 ) && applyAlfLineBufBoundary == 1~~ | 1 | 1 |
| 4 | Otherwise            2002 | 1 | 2 |

Table 7: ALF Data Syntax for Signaling Filter Coefficients

| 1 | alf_data( ) { | Descriptor |
|---|---|---|
| 2 |   if( alf_cc_cb_filter_signal_flag ) { | |
| 3 |     alf_cc_cb_filters_signalled_minus1 | ue(v) |
| 4 |     for( k = 0; k < alf_cc_cb_filters_signalled_minus1 + 1; k++ ) { | |
| 5 |       for( j = 0; j < ~~7~~ 6; j++ ) { | |
| 6 | 2202 —         alf_cc_cb_mapped_coeff_abs[ k ][ j ] | u(3) |
| 7 |         if( alf_cc_cb_mapped_coeff_abs[ k ][ j ] ) | |
| 8 |           alf_cc_cb_coeff_sign[ k ][ j ] | u(1) |
| 9 |       } | |
| 10 |     } | |
| 11 |   } | |
| 12 |   if( alf_cc_cr_filter_signal_flag ) { | |
| 13 |     alf_cc_cr_filters_signalled_minus1 | ue(v) |
| 14 |     for( k = 0; k < alf_cc_cr_filters_signalled_minus1 + 1; k++ ) { | |
| 15 |       for( j = 0; j < ~~7~~ 6; j++ ) { | |
| 16 | 2204 —         alf_cc_cr_mapped_coeff_abs[ k ][ j ] | u(3) |
| 17 |         if( alf_cc_cr_mapped_coeff_abs[ k ][ j ] ) | |
| 18 |           alf_cc_cr_coeff_sign[ k ][ j ] | u(1) |
| 19 |       } | |
| 20 |     } | |
| 21 |   } | |
| 22 | } | |

FIG. 22

8.8.5.7 Cross-component filtering process

Inputs of this process are:
- a reconstructed luma picture sample array recPicture$_L$ prior to the luma adaptive loop filtering process,
- a filtered reconstructed chroma picture sample array alfPicture$_C$,
- a chroma location ( xCtbC, yCtbC ) specifying the top-left sample of the current chroma coding tree block relative to the top-left sample of the current picture,
- a CTB width ccAlfWidth in chroma samples,
- a CTB height ccAlfHeight in chroma samples,
- cross-component filter coefficients CcAlfCoeff[ j ], with j = 0 ... ~~6~~ 5.  ╱— 2302

Output of this process is the modified filtered reconstructed chroma picture sample array ccAlfPicture.

..................

- The vertical sample position offsets yP1 and yP2 are specified in Table 47 according to the vertical luma sample position (y * subHeightC) and applyAlfLineBufBoundary.
- The variable curr is derived as follows:

curr = alfPicture$_C$[ xCtbC + x ][ yCtbC + y ]    ╱— 2304  (1530)

- The array of cross-component filter coefficients f[ j ] is derived as follows with j = 0 ... ~~6~~ 5:

f[ j ] = CcAlfCoeff[ j ]    (1531)

- The variable sum is derived as follows:

~~sum = f[ 0 ] * ( recPicture$_L$[ h$_x$ ][ v$_{y-yP1}$ ] − recPicture$_L$[ h$_x$ ][ v$_y$ ] ) +~~
~~f[ 1 ] * ( recPicture$_L$[ h$_{x-1}$ ][ v$_y$ ] − recPicture$_L$[ h$_x$ ][ v$_y$ ] ) +~~
~~f[ 2 ] * ( recPicture$_L$[ h$_{x+1}$ ][ v$_y$ ] − recPicture$_L$[ h$_x$ ][ v$_y$ ] ) +~~
~~f[ 3 ] * ( recPicture$_L$[ h$_{x-1}$ ][ v$_{y+yP1}$ ] − recPicture$_L$[ h$_x$ ][ v$_y$ ] ) +~~    ╱— 2306
~~f[ 4 ] * ( recPicture$_L$[ h$_x$ ][ v$_{y+yP1}$ ] − recPicture$_L$[ h$_x$ ][ v$_y$ ] ) +~~
~~f[ 5 ] * ( recPicture$_L$[ h$_{x+1}$ ][ v$_{y+yP1}$ ] − recPicture$_L$[ h$_x$ ][ v$_y$ ] ) +~~
~~f[ 6 ] * ( recPicture$_L$[ h$_x$ ][ v$_{y+yP2}$ ] − recPicture$_L$[ h$_x$ ][ v$_y$ ] )~~ sum = f[ 0 ] * ( recPicture$_L$[ h$_x$ ][ v$_{y-yP2}$ ] − recPicture$_L$[ h$_x$ ][ v$_y$ ] ) +
f[ 1 ] * ( recPicture$_L$[ h$_x$ ][ v$_{y-yP1}$ ] − recPicture$_L$[ h$_x$ ][ v$_y$ ] ) +
f[ 2 ] * ( recPicture$_L$[ h$_{x-1}$ ][ v$_y$ ] − recPicture$_L$[ h$_x$ ][ v$_y$ ] ) +
f[ 3 ] * ( recPicture$_L$[ h$_{x+1}$ ][ v$_y$ ] − recPicture$_L$[ h$_x$ ][ v$_y$ ] ) +
f[ 4 ] * ( recPicture$_L$[ h$_x$ ][ v$_{y+yP1}$ ] − recPicture$_L$[ h$_x$ ][ v$_y$ ] ) +
f[ 5 ] * ( recPicture$_L$[ h$_x$ ][ v$_{y+yP2}$ ] − recPicture$_L$[ h$_x$ ][ v$_y$ ] )

scaledSum = Clip3( −( 1 << ( BitDepth − 1 ) ), ( 1 << ( BitDepth − 1 ) ) − 1, ( sum + 64 ) >> 7)    (1533)
sum = curr + scaledSum    (1534)

- The modified filtered reconstructed chroma picture sample ccAlfPicture[ xCtbC + x ][ yCtbC + y ] is derived as follows:

ccAlfPicture[ xCtbC + x ][ yCtbC + y ] = Clip3( 0, ( 1 << BitDepth ) − 1, sum )    (1535)

FIG. 23

Table 8: Specification of yP1 and yP2 Associated with 7-tap 3×5 Cross-Shape Filter

| 1 | Condition | yP1 | yP2 |
|---|---|---|---|
| 2 | ( y * subHeightC == CtbSizeY − 5 \|\| y * subHeightC == CtbSizeY − 4 ) && applyAlfLineBufBoundary == 1 | 0 | 0 |
| 3 | ( y * subHeightC == CtbSizeY − 6 \|\| y * subHeightC == CtbSizeY − 3 \|\| *y * subHeightC == CtbSizeY − 2* ) && applyAlfLineBufBoundary == 1 | 1 | 1 |
| 4 | Otherwise | 1 | 2 |

FIG. 24

Table 9: ALF Data Syntax for Signaling Filter Coefficients

| 1 | alf_data( ) { | Descriptor |
|---|---|---|
| 2 |   if( alf_cc_cb_filter_signal_flag ) { | |
| 3 |     *numccalfFilterCoeffminus1 = sps_chroma_vertical_collocated_flag ? 6 : 7* | |
| 4 |     alf_cc_cb_filters_signalled_minus1 | ue(v) |
| 5 |     for( k = 0; k < alf_cc_cb_filters_signalled_minus1 + 1; k++ ) { | |
| 6 |       for( j = 0; j < ~~7~~ *numccalfFilterCoeffminus1*; j++ ) { | |
| 7 | 2702       alf_cc_cb_mapped_coeff_abs[ k ][ j ] | u(3) |
| 8 |         if( alf_cc_cb_mapped_coeff_abs[ k ][ j ] ) | |
| 9 |           alf_cc_cb_coeff_sign[ k ][ j ] | u(1) |
| 10 |       } | |
| 11 |     } | |
| 12 |   } | |
| 13 |   if( alf_cc_cr_filter_signal_flag ) { | |
| 14 |     alf_cc_cr_filters_signalled_minus1 | ue(v) |
| 15 |     for( k = 0; k < alf_cc_cr_filters_signalled_minus1 + 1; k++ ) { | |
| 16 |       for( j = 0; j < ~~7~~ *numccalfFilterCoeffminus1*; j++ ) { | |
| 17 | 2704       alf_cc_cr_mapped_coeff_abs[ k ][ j ] | u(3) |
| 18 |         if( alf_cc_cr_mapped_coeff_abs[ k ][ j ] ) | |
| 19 |           alf_cc_cr_coeff_sign[ k ][ j ] | u(1) |
| 20 |       } | |
| 21 |     } | |
| 22 |   } | |
| 23 | } | |

FIG. 27

8.8.5.7 Cross-component filtering process

Inputs of this process are:
- a reconstructed luma picture sample array recPicture$_L$ prior to the luma adaptive loop filtering process,
- a filtered reconstructed chroma picture sample array alfPicture$_C$,
- a chroma location ( xCtbC, yCtbC ) specifying the top-left sample of the current chroma coding tree block relative to the top-left sample of the current picture,
- a CTB width ccAlfWidth in chroma samples,
- a CTB height ccAlfHeight in chroma samples, s-component filter coefficients CcAlfCoeff[ j ], with j = 0.. 1-6 ← 2802 numccalfFilterCoeffminus1.

Output of this process is the modified filtered reconstructed chroma picture sample array ccAlfPicture.

..................

- The vertical sample position offsets yP1 and yP2 are specified in Table 47 according to the vertical luma sample position (y * subHeightC ) and applyAlfLineBufBoundary.
- The variable curr is derived as follows:
    curr = alfPicture$_C$[ xCtbC + x ][ yCtbC + y ]    ← 2804    (1530)
- The array of cross-component filter coefficients f[ j ] is derived as follows with j = 0.. 1-6 numccalfFilterCoeffminus1:
    f[ j ] = CcAlfCoeff[ j ]    (1531)
- If sps_chroma_vertical_collocated_flag == 0, the variable sum is derived as follows:
    sum =  f[ 0 ] * ( recPicture$_L$[ h$_x$ ][ v$_{y-yP1}$ ] − recPicture$_L$[ h$_x$ ][ v$_y$ ] ) +
           f[ 1 ] * ( recPicture$_L$[ h$_{x-1}$ ][ v$_y$ ] − recPicture$_L$[ h$_x$ ][ v$_y$ ] ) +
           f[ 2 ] * ( recPicture$_L$[ h$_{x+1}$ ][ v$_y$ ] − recPicture$_L$[ h$_x$ ][ v$_y$ ] ) +
           f[ 3 ] * ( recPicture$_L$[ h$_{x-1}$ ][ v$_{y+yP1}$ ] − recPicture$_L$[ h$_x$ ][ v$_y$ ] ) +
           f[ 4 ] * ( recPicture$_L$[ h$_x$ ][ v$_{y+yP1}$ ] − recPicture$_L$[ h$_x$ ][ v$_y$ ] ) +
           f[ 5 ] * ( recPicture$_L$[ h$_{x+1}$ ][ v$_{y+yP1}$ ] − recPicture$_L$[ h$_x$ ][ v$_y$ ] ) +
           f[ 6 ] * ( recPicture$_L$[ h$_x$ ][ v$_{y+yP2}$ ] − recPicture$_L$[ h$_x$ ][ v$_y$ ] )

- *If sps_chroma_vertical_collocated_flag == 1, the variable sum is derived as follows:*
    *sum =  f[ 0 ] * ( recPicture$_L$[ h$_x$ ][ v$_{y-yP1}$ ] − recPicture$_L$[ h$_x$ ][ v$_y$ ] ) +*
           *f[ 1 ] * ( recPicture$_L$[ h$_{x-2}$ ][ v$_y$ ] − recPicture$_L$[ h$_x$ ][ v$_y$ ] ) +*
           *f[ 2 ] * ( recPicture$_L$[ h$_{x-1}$ ][ v$_y$ ] − recPicture$_L$[ h$_x$ ][ v$_y$ ] ) +*
           *f[ 3 ] * ( recPicture$_L$[ h$_{x+1}$ ][ v$_y$ ] − recPicture$_L$[ h$_x$ ][ v$_y$ ] ) +*
           *f[ 4 ] * ( recPicture$_L$[ h$_{x+2}$ ][ v$_y$ ] − recPicture$_L$[ h$_x$ ][ v$_y$ ] ) +*
           *f[ 5 ] * ( recPicture$_L$[ h$_x$ ][ v$_{y+yP1}$ ] − recPicture$_L$[ h$_x$ ][ v$_y$ ] )* scaledSum = Clip3( −( 1 << ( BitDepth − 1 ) ), ( 1 << ( BitDepth − 1 ) ) − 1, ( sum + 64 ) >> 7 )    (1533)
    sum = curr + scaledSum    (1534)
- The modified filtered reconstructed chroma picture sample ccAlfPicture[ xCtbC + x ][ yCtbC + y ] is derived as follows:
    ccAlfPicture[ xCtbC + x ][ yCtbC + y ] = Clip3( 0, ( 1 << BitDepth ) − 1, sum )    (1535)

FIG. 28

8.8.5.7 Cross-component filtering process

Inputs of this process are:
- a reconstructed luma picture sample array recPicture$_L$ prior to the luma adaptive loop filtering process,
- a filtered reconstructed chroma picture sample array alfPicture$_C$,
- a chroma location ( xCtbC, yCtbC ) specifying the top-left sample of the current chroma coding tree block relative to the top-left sample of the current picture,
- a CTB width ccAlfWidth in chroma samples,
- a CTB height ccAlfHeight in chroma samples, s-component filter coefficients CcAlfCoeff[ j ], with j = 0..6.

Output of this process is the modified filtered reconstructed chroma picture sample array ccAlfPicture.

................
- The vertical sample position offsets yP1 and yP2 are specified in Table 47 according to the vertical luma sample position (y * subHeightC ) and applyAlfLineBufBoundary.
- The variable curr is derived as follows:
    curr = alfPicture$_C$[ xCtbC + x ][ yCtbC + y ]  (1530)
- The array of cross-component filter coefficients f[ j ] is derived as follows with j = 0..6:
    f[ j ] = CcAlfCoeff[ j ]  (1531)
- *If sps_chroma_vertical_collocated_flag == 0*, the variable sum is derived as follows:
    sum =   f[ 0 ] * ( recPicture$_L$[ h$_x$ ][ v$_{y-yP1}$ ] − recPicture$_L$[ h$_x$ ][ v$_y$ ] ) +
            f[ 1 ] * ( recPicture$_L$[ h$_{x-1}$ ][ v$_y$ ] − recPicture$_L$[ h$_x$ ][ v$_y$ ] ) +
            f[ 2 ] * ( recPicture$_L$[ h$_{x+1}$ ][ v$_y$ ] − recPicture$_L$[ h$_x$ ][ v$_y$ ] ) +
            f[ 3 ] * ( recPicture$_L$[ h$_{x-1}$ ][ v$_{y+yP1}$ ] − recPicture$_L$[ h$_x$ ][ v$_y$ ] ) +
            f[ 4 ] * ( recPicture$_L$[ h$_x$ ][ v$_{y+yP1}$ ] − recPicture$_L$[ h$_x$ ][ v$_y$ ] ) +
            f[ 5 ] * ( recPicture$_L$[ h$_{x+1}$ ][ v$_{y+yP1}$ ] − recPicture$_L$[ h$_x$ ][ v$_y$ ] ) +
            f[ 6 ] * ( recPicture$_L$[ h$_x$ ][ v$_{y+yP2}$ ] − recPicture$_L$[ h$_x$ ][ v$_y$ ] )

- *If sps_chroma_vertical_collocated_flag == 1, the variable sum is derived as follows:*
-   *sum =   f[ 0 ] * ( recPicture$_L$[ h$_x$ ][ v$_{y-yP1}$ ] − recPicture$_L$[ h$_x$ ][ v$_y$ ] ) +*
            *f[ 1 ] * ( recPicture$_L$[ h$_{x-2}$ ][ v$_y$ ] − recPicture$_L$[ h$_x$ ][ v$_y$ ] ) +*
            *f[ 2 ] * ( recPicture$_L$[ h$_{x-1}$ ][ v$_y$ ] − recPicture$_L$[ h$_x$ ][ v$_y$ ] ) +*
            *f[ 3 ] * ( recPicture$_L$[ h$_{x+1}$ ][ v$_y$ ] − recPicture$_L$[ h$_x$ ][ v$_y$ ] ) +*
            *f[ 4 ] * ( recPicture$_L$[ h$_{x+2}$ ][ v$_y$ ] − recPicture$_L$[ h$_x$ ][ v$_y$ ] ) +*
            *f[ 5 ] * ( recPicture$_L$[ h$_x$ ][ v$_{y+yP1}$ ] − recPicture$_L$[ h$_x$ ][ v$_y$ ] ) +*
            *f[ 6 ] * ( recPicture$_L$[ h$_x$ ][ v$_{y+yP2}$ ] − recPicture$_L$[ h$_x$ ][ v$_y$ ] )* scaledSum = Clip3( −( 1 << ( BitDepth − 1 ) ), ( 1 << ( BitDepth − 1 ) ) − 1, ( sum + 64 ) >> 7 )  (1533)
    sum = curr + scaledSum  (1534)
- The modified filtered reconstructed chroma picture sample ccAlfPicture[ xCtbC + x ][ yCtbC + y ] is derived as follows:
    ccAlfPicture[ xCtbC + x ][ yCtbC + y ] = Clip3( 0, ( 1 << BitDepth ) − 1, sum )  (1535)

FIG. 29

8.8.5.7 Cross-component filtering process
..................
- The variable sum is derived as follows:
- sum =  f[ 0 ] * ( recPicture_L[ h_x ][ v_{y-yP1} ] − recPicture_L[ h_x ][ v_y ] ) +
  f[ 1 ] * ( recPicture_L[ h_{x-1} ][ v_y ] − recPicture_L[ h_x ][ v_y ] ) +
  f[ 2 ] * ( recPicture_L[ h_{x+1} ][ v_y ] − recPicture_L[ h_x ][ v_y ] ) +
  f[ 3 ] * ( recPicture_L[ h_{x-1} ][ v_{y+yP1} ] − recPicture_L[ h_x ][ v_y ] ) +
  f[ 4 ] * ( recPicture_L[ h_x ][ v_{y+yP1} ] − recPicture_L[ h_x ][ v_y ] ) +
  f[ 5 ] * ( recPicture_L[ h_{x+1} ][ v_{y+yP1} ] − recPicture_L[ h_x ][ v_y ] ) +
  f[ 6 ] * ( recPicture_L[ h_x ][ v_{y+yP2} ] − recPicture_L[ h_x ][ v_y ] )                        3002 scaledSum = Clip3( −( 1 << ( BitDepth − 1 ) ), ( 1 << ( BitDepth − 1 ) ) − 1, ( sum + 64 ) >> *alfShiftY*)
   (1533)
sum = curr + scaledSum                                                                              (1534)

FIG. 30

Table 10: Specification of yP1, yP2, and alfShiftY in Modified Cross-Component Filtering Process

| 1 | Condition | *alfShiftY* | yP1 | yP2 |
|---|---|---|---|---|
| 2 | ( y * subHeightC == CtbSizeY − 5 \|\| y * subHeightC == CtbSizeY − 4 ) && applyAlfLineBufBoundary == 1 | 10 | 0 | 0 |
| 3 | ( y * subHeightC == CtbSizeY − 6 \|\| y * subHeightC == CtbSizeY − 3 ) && applyAlfLineBufBoundary == 1 | 7 | 1 | 1 |
| 4 | Otherwise | 7 | 1 | 2 |

FIG. 31

Table 11: Specification of y1, y2, and alfShiftY in VVC Draft 8

| 1 | Condition | alfShiftY | y1 | y2 | y3 |
|---|---|---|---|---|---|
| 2 | ( y == CtbSizeY − 5 \|\| y == CtbSizeY − 4 ) && ( applyAlfLineBufBoundary == 1 ) | 10 | 0 | 0 | 0 |
| 3 | ( y == CtbSizeY − 6 \|\| y == CtbSizeY − 3 ) && ( applyAlfLineBufBoundary == 1 ) | 7 | 1 | 1 | 1 |
| 4 | ( y == CtbSizeY − 7 \|\| y == CtbSizeY − 2 ) && ( applyAlfLineBufBoundary == 1 ) | 7 | 1 | 2 | 2 |
| 5 | otherwise | 7 | 1 | 2 | 3 |

FIG. 32

8.8.5.7 Cross-component filtering process

Inputs of this process are:
- a reconstructed luma picture sample array recPicture$_L$ prior to the luma adaptive loop filtering process,
- a filtered reconstructed chroma picture sample array alfPicture$_C$,
- a chroma location ( xCtbC, yCtbC ) specifying the top-left sample of the current chroma coding tree block relative to the top-left sample of the current picture,
- a CTB width ccAlfWidth in chroma samples,
- a CTB height ccAlfHeight in chroma samples,
- ss-component filter coefficients CcAlfCoeff[ j ], with j = 0..6 .

Output of this process is the modified filtered reconstructed chroma picture sample array ccAlfPicture.

...............

- The vertical sample position offsets yP1 and yP2 are specified in Table 47 according to the vertical luma sample position (y * subHeightC ) and applyAlfLineBufBoundary.
- The variable curr is derived as follows:

curr = alfPicture$_C$[ xCtbC + x ][ yCtbC + y ]　　　　　　　　　　　　　　　(1530)

- The array of cross-component filter coefficients f[ j ] is derived as follows with j = 0..6:

f[ j ] = CcAlfCoeff[ j ]　　　　　　　　　　　　　　　(1531)

- The variable sum is derived as follows:

sum =　f[ 0 ] * ( recPicture$_L$[ h$_x$ ][ v$_{y-yP1}$ ] − recPicture$_L$[ h$_x$ ][ v$_y$ ] ) +
    　　　　f[ 1 ] * ( recPicture$_L$[ h$_{x-1}$ ][ v$_y$ ] − recPicture$_L$[ h$_x$ ][ v$_y$ ] ) +
    　　　　f[ 2 ] * ( recPicture$_L$[ h$_{x+1}$ ][ v$_y$ ] − recPicture$_L$[ h$_x$ ][ v$_y$ ] ) +
    　　　　f[ 3 ] * ( recPicture$_L$[ h$_{x-1}$ ][ v$_{y+yP1}$ ] − recPicture$_L$[ h$_x$ ][ v$_y$ ] ) +
    　　　　f[ 4 ] * ( recPicture$_L$[ h$_x$ ][ v$_{y+yP1}$ ] − recPicture$_L$[ h$_x$ ][ v$_y$ ] ) +
    　　　　f[ 5 ] * ( recPicture$_L$[ h$_{x+1}$ ][ v$_{y+yP1}$ ] − recPicture$_L$[ h$_x$ ][ v$_y$ ] ) +
    　　　　f[ 6 ] * ( recPicture$_L$[ h$_x$ ][ v$_{y-yP2}$ ] − recPicture$_L$[ h$_x$ ][ v$_y$ ] )　　　　　　　　/ 3302

~~scaledSum = Clip3( −( 1 << ( BitDepth − 1 ) ), ( 1 << ( BitDepth − 1 ) ) − 1, ( sum + 64 ) >> 7 )~~　　(1533)

sum = curr + ~~scaledSum~~ *(sum + 64) >> 7*　　　　　　　　　　　　(1534)

- The modified filtered reconstructed chroma picture sample ccAlfPicture[ xCtbC + x ][ yCtbC + y ] is derived as follows:

ccAlfPicture[ xCtbC + x ][ yCtbC + y ] = Clip3( 0, ( 1 << BitDepth ) − 1, sum )　　(1535)

FIG. 33

METHOD AND APPARATUS FOR CROSS COMPONENT FILTERING

CROSS-REFERENCE TO RELATED APPLICATIONS

The present disclosure claims priority to U.S. provisional application No. 63/000,451, filed on Mar. 26, 2020, the content of which is incorporated herein by reference in its entirety.

TECHNICAL FIELD

The present disclosure generally relates to video processing, and more particularly, to methods for cross component filtering.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of present disclosure provide methods and apparatuses for video processing. In an aspect, a non-transitory computer-readable medium is provided, which stores a set of instructions that is executable by at least one processor of an apparatus to cause the apparatus to perform a method. The method includes: filtering a luma sample using a first filter in a video coding process, the first filter being represented as a cross shape; filtering a chroma sample associated with the luma sample using a second filter in the video coding process; determining, based on the filtered luma sample, a residual correction value corresponding to the chroma sample; and determining a corrected chroma sample based on the residual correction value and the filtered chroma sample.

In another aspect, a non-transitory computer-readable medium is provided, which stores a set of instructions that is executable by at least one processor of an apparatus to cause the apparatus to perform a method. The method includes: filtering a luma sample using a first filter in a video coding process; filtering a chroma sample associated with the luma sample using a second filter in the video coding process, wherein a shifting parameter value of the first filter is the same as a shifting parameter value of the second filter; determining, based on the filtered luma sample, a residual correction value corresponding to the chroma sample; and determining a corrected chroma sample based on the residual correction value and the filtered chroma sample.

In yet another aspect, a non-transitory computer-readable medium is provided, which stores a set of instructions that is executable by at least one processor of an apparatus to cause the apparatus to perform a method. The method includes: filtering a luma sample using a first filter in a video coding process, wherein the first filter includes N first clipping operation, and N is an integer greater than or equal to one; filtering a chroma sample associated with the luma sample using a second filter in the video coding process, wherein the second filter includes N second clipping operation; determining, based on the filtered luma sample, a residual correction value corresponding to the chroma sample; and determining a corrected chroma sample based on the residual correction value and the filtered chroma sample.

In yet another aspect, an apparatus for video processing is provided. The apparatus includes a memory configured to store a set of instructions and one or more processors communicatively coupled to the memory and configured to execute the set of instructions to cause the apparatus to perform: filtering a luma sample using a first filter in a video coding process, the first filter being represented as a cross shape; filtering a chroma sample associated with the luma sample using a second filter in the video coding process; determining, based on the filtered luma sample, a residual correction value corresponding to the chroma sample; and determining a corrected chroma sample based on the residual correction value and the filtered chroma sample.

In yet another aspect, an apparatus for video processing is provided. The apparatus includes a memory configured to store a set of instructions and one or more processors communicatively coupled to the memory and configured to execute the set of instructions to cause the apparatus to perform: filtering a luma sample using a first filter in a video coding process; filtering a chroma sample associated with the luma sample using a second filter in the video coding process, wherein a shifting parameter value of the first filter is the same as a shifting parameter value of the second filter; determining, based on the filtered luma sample, a residual correction value corresponding to the chroma sample; and determining a corrected chroma sample based on the residual correction value and the filtered chroma sample.

In yet another aspect, an apparatus for video processing is provided. The apparatus includes a memory configured to store a set of instructions and one or more processors communicatively coupled to the memory and configured to execute the set of instructions to cause the apparatus to perform: filtering a luma sample using a first filter in a video coding process, wherein the first filter includes N first clipping operation, and N is an integer greater than or equal to one; filtering a chroma sample associated with the luma sample using a second filter in the video coding process, wherein the second filter includes N second clipping operation; determining, based on the filtered luma sample, a residual correction value corresponding to the chroma sample; and determining a corrected chroma sample based on the residual correction value and the filtered chroma sample.

In yet another aspect, a computer-implemented method is provided. The method includes: filtering a luma sample using a first filter in a video coding process, the first filter being represented as a cross shape; filtering a chroma sample associated with the luma sample using a second filter in the video coding process; determining, based on the filtered luma sample, a residual correction value corresponding to the chroma sample; and determining a corrected chroma sample based on the residual correction value and the filtered chroma sample.

In yet another aspect, a computer-implemented method is provided. The method includes: filtering a luma sample using a first filter in a video coding process; filtering a chroma sample associated with the luma sample using a second filter in the video coding process, wherein a shifting parameter value of the first filter is the same as a shifting parameter value of the second filter; determining, based on the filtered luma sample, a residual correction value corresponding to the chroma sample; and determining a corrected chroma sample based on the residual correction value and the filtered chroma sample.

In yet another aspect, a computer-implemented method is provided. The method includes: filtering a luma sample using a first filter in a video coding process, wherein the first filter includes N first clipping operation, and N is an integer greater than or equal to one; filtering a chroma sample associated with the luma sample using a second filter in the video coding process, wherein the second filter includes N second clipping operation; determining, based on the filtered luma sample, a residual correction value corresponding to the chroma sample; and determining a corrected chroma sample based on the residual correction value and the filtered chroma sample.

BRIEF DESCRIPTION OF THE DRAWINGS

Embodiments and various aspects of present disclosure are illustrated in the following detailed description and the accompanying figures. Various features shown in the figures are not drawn to scale.

FIG. 8 illustrates modified description in a VVC standard for a video coding process using an 8-tap 5×4 cross-shape filter, consistent with some embodiments of this disclosure.

FIG. 10 illustrates a table of example adaptive loop filter (ALF) data syntax of a 9-tap 5×5 cross-shape filter for signaling filter coefficients, consistent with some embodiments of this disclosure.

FIG. 11 illustrates modified description in a VVC standard for a video coding process using a 9-tap 5×5 cross-shape filter, consistent with some embodiments of this disclosure.

FIG. 12 illustrates a table of example specification of parameters for handling boundary conditions associated with a 9-tap 5-5 cross-shape filter for a CCALF, consistent with some embodiments of this disclosure.

FIG. 14 illustrates a table of example ALF data syntax of a 13-tap 7×7 cross-shape filter for signaling filter coefficients, consistent with some embodiments of this disclosure.

FIG. 15 illustrates modified description in a VVC standard for a video coding process using a 13-tap 7×7 cross-shape filter, consistent with some embodiments of this disclosure.

FIG. 16 illustrates a table of example specification of parameters for handling boundary conditions associated with a 13-tap 7×7 cross-shape filter for a CCALF, consistent with some embodiments of this disclosure.

FIG. 18 illustrates a table of example ALF data syntax of a 7-tap 5×3 cross-shape filter for signaling filter coefficients, consistent with some embodiments of this disclosure.

FIG. 19 illustrates modified description in a VVC standard for a video coding process using a 7-tap 5-3 cross-shape filter, consistent with some embodiments of this disclosure.

FIG. 20 illustrates a table of example specification of parameters for handling boundary conditions associated with a 7-tap 5×3 cross-shape filter for a CCALF, consistent with some embodiments of this disclosure.

FIG. 22 illustrates a table of example ALF data syntax of a 7-tap 3×5 cross-shape filter for signaling filter coefficients, consistent with some embodiments of this disclosure.

FIG. 23 illustrates modified description in a VVC standard for a video coding process using a 7-tap 3×5 cross-shape filter, consistent with some embodiments of this disclosure.

FIG. 24 illustrates a table of example specification of parameters for handling boundary conditions associated with a 7-tap 3×5 cross-shape filter for a CCALF, consistent with some embodiments of this disclosure.

FIG. 27 illustrates a table of example ALF data syntax of two example controllable filters for signaling filter coefficients, consistent with some embodiments of this disclosure.

FIG. 28 illustrates modified description in a VVC standard for a video coding process using two example controllable filters for signaling filter coefficients, consistent with some embodiments of this disclosure.

FIG. 29 illustrates modified description in a VVC standard for a video coding process using two other example controllable filters for signaling filter coefficients, consistent with some embodiments of this disclosure.

FIG. 30 illustrates modified description in a VVC standard for a cross-component filtering process, consistent with some embodiments of this disclosure.

FIG. 31 illustrates a table of example specification of parameters for handling boundary conditions associated with a modified cross-component filtering process of a CCALF, consistent with some embodiments of this disclosure.

FIG. 32 illustrates a table of specification of parameters of an ALF process in VVC Draft 8.

FIG. 33 illustrates modified description in a VVC standard associated with a clipping operation in a cross-component filtering process, consistent with some embodiments of this disclosure.

DETAILED DESCRIPTION

Figure 1:
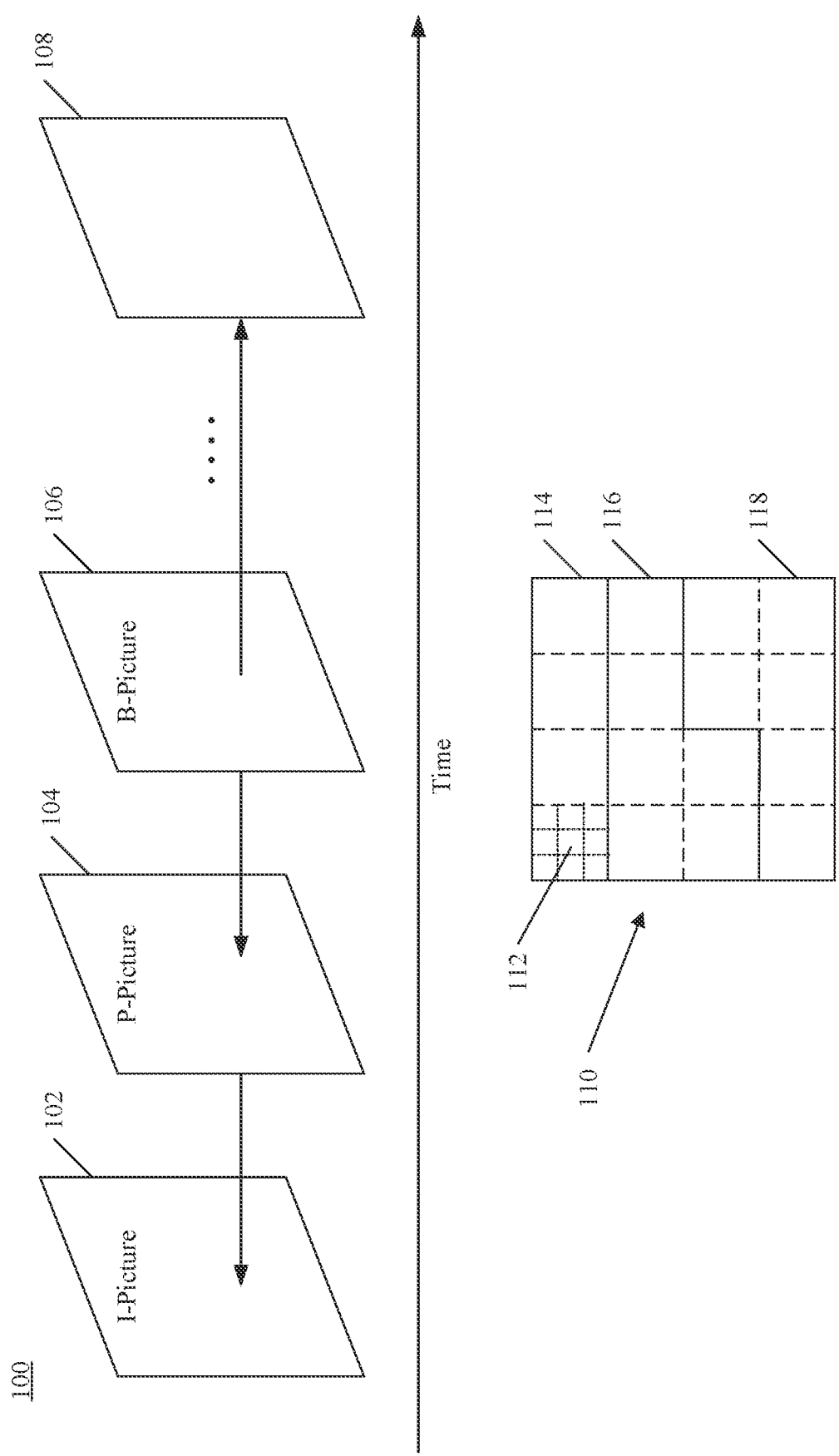
FIG. 1 is a schematic diagram illustrating structures of an example video sequence, consistent with some embodiments of this disclosure.

Reference can now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims. Particular aspects of present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC. The VCEG and MPEG have also formally started the development of next generation video compression standard beyond HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture" or "target picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the target picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, consistent with some embodiments of this disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64-64, 32-32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
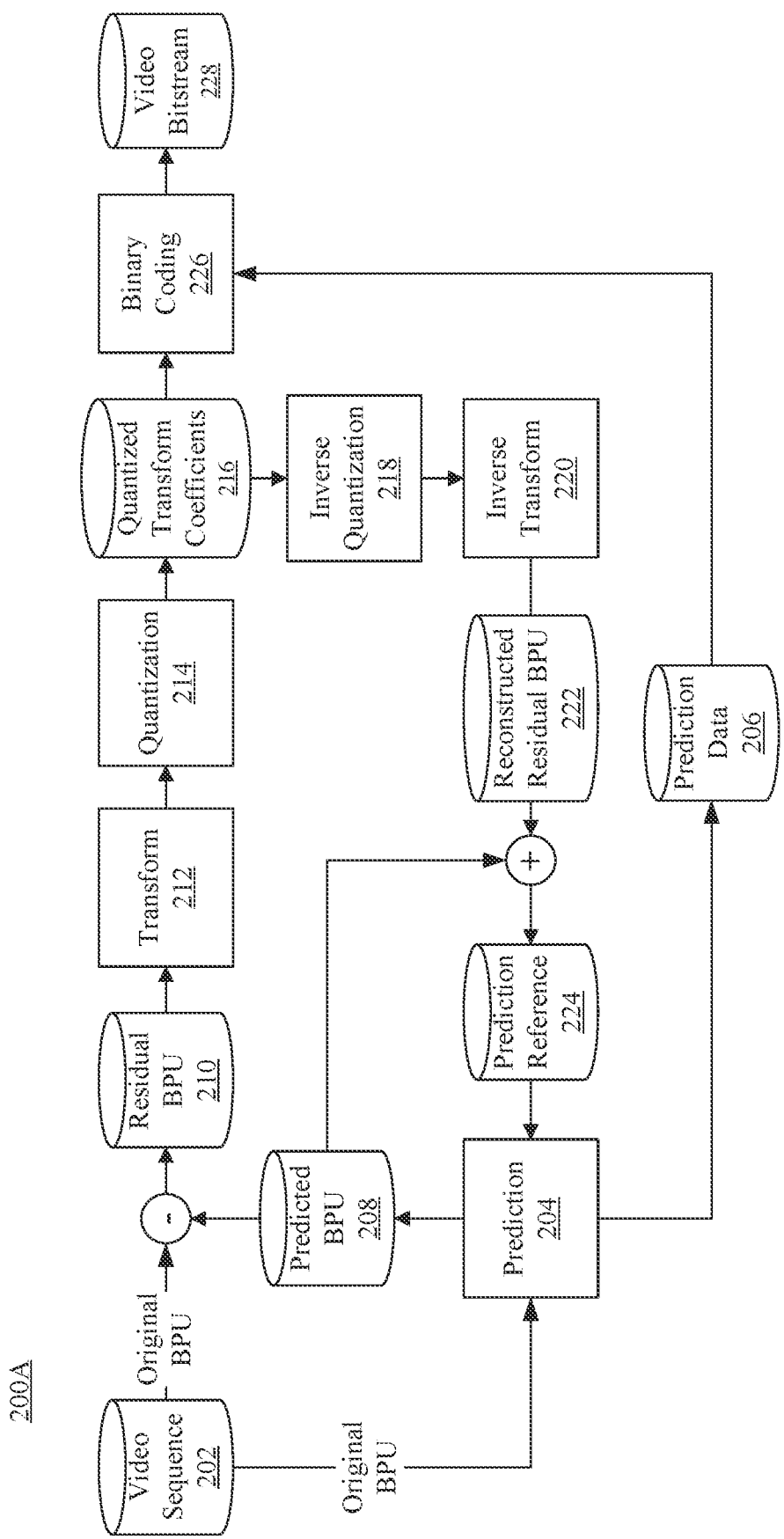
FIG. 2A illustrates a schematic diagram of an example encoding process of a hybrid video coding system, consistent with embodiments of the disclosure.
Figure 2B:
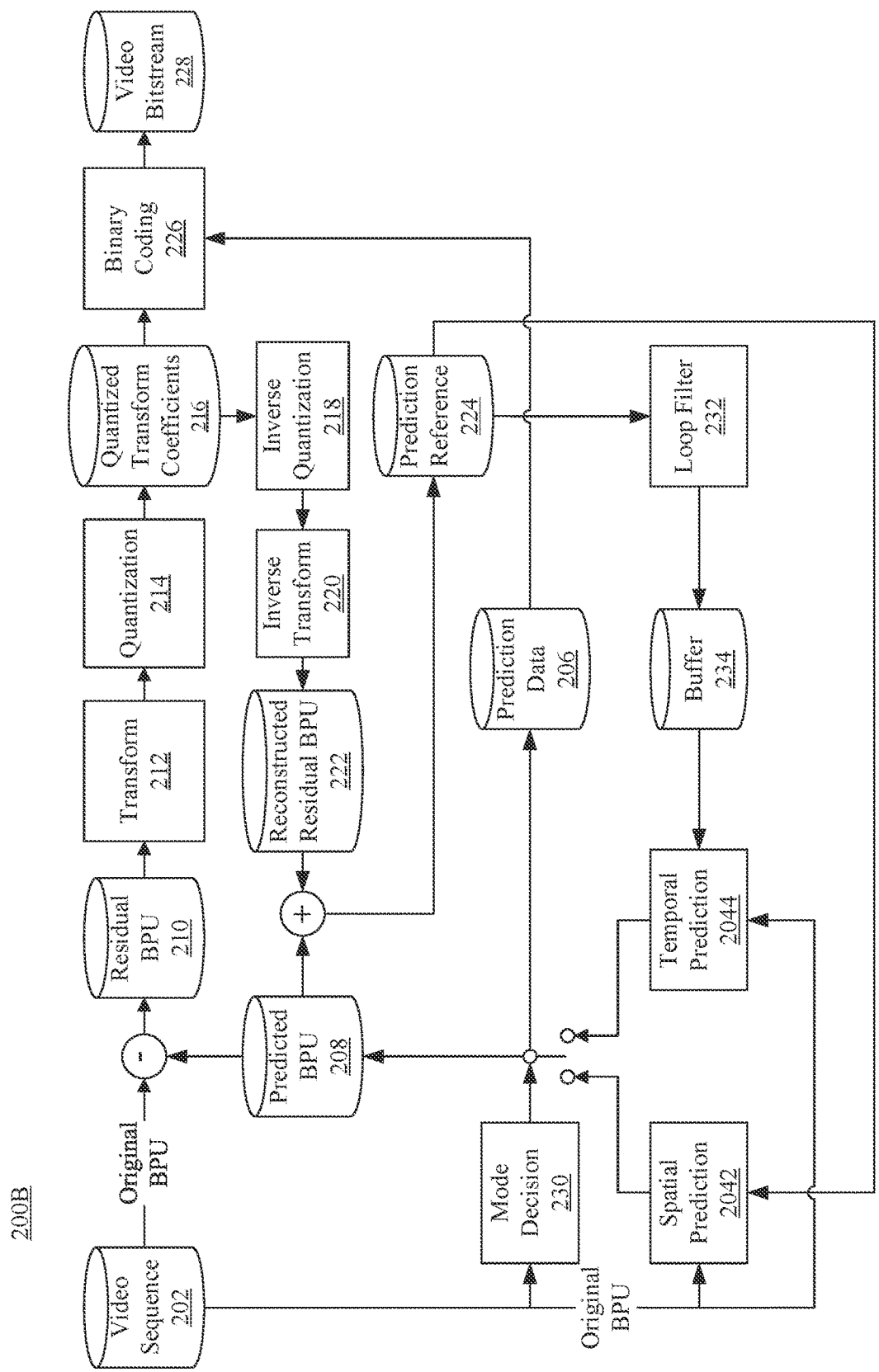
FIG. 2B illustrates a schematic diagram of another example encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., grayscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the target BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the target BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a target picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the target picture. For example, the search window can be centered at a location having the same coordinates in the reference picture as the original BPU in the target picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the target picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the target picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the target picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the target picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the target BPU that has been encoded and reconstructed in the target picture), the encoder can directly feed prediction reference 224 to spatial prediction stage 2042 for later usage (e.g., for extrapolation of a next BPU of the target picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets ("SAO"), adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
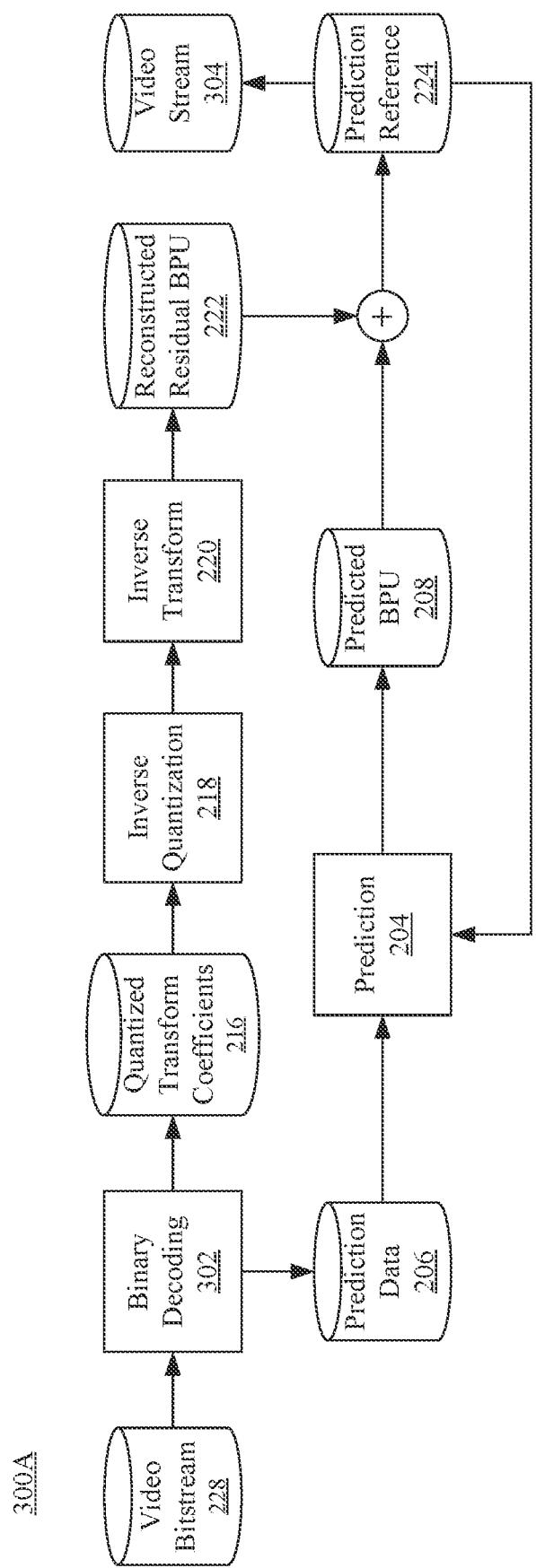
FIG. 3A illustrates a schematic diagram of an example decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
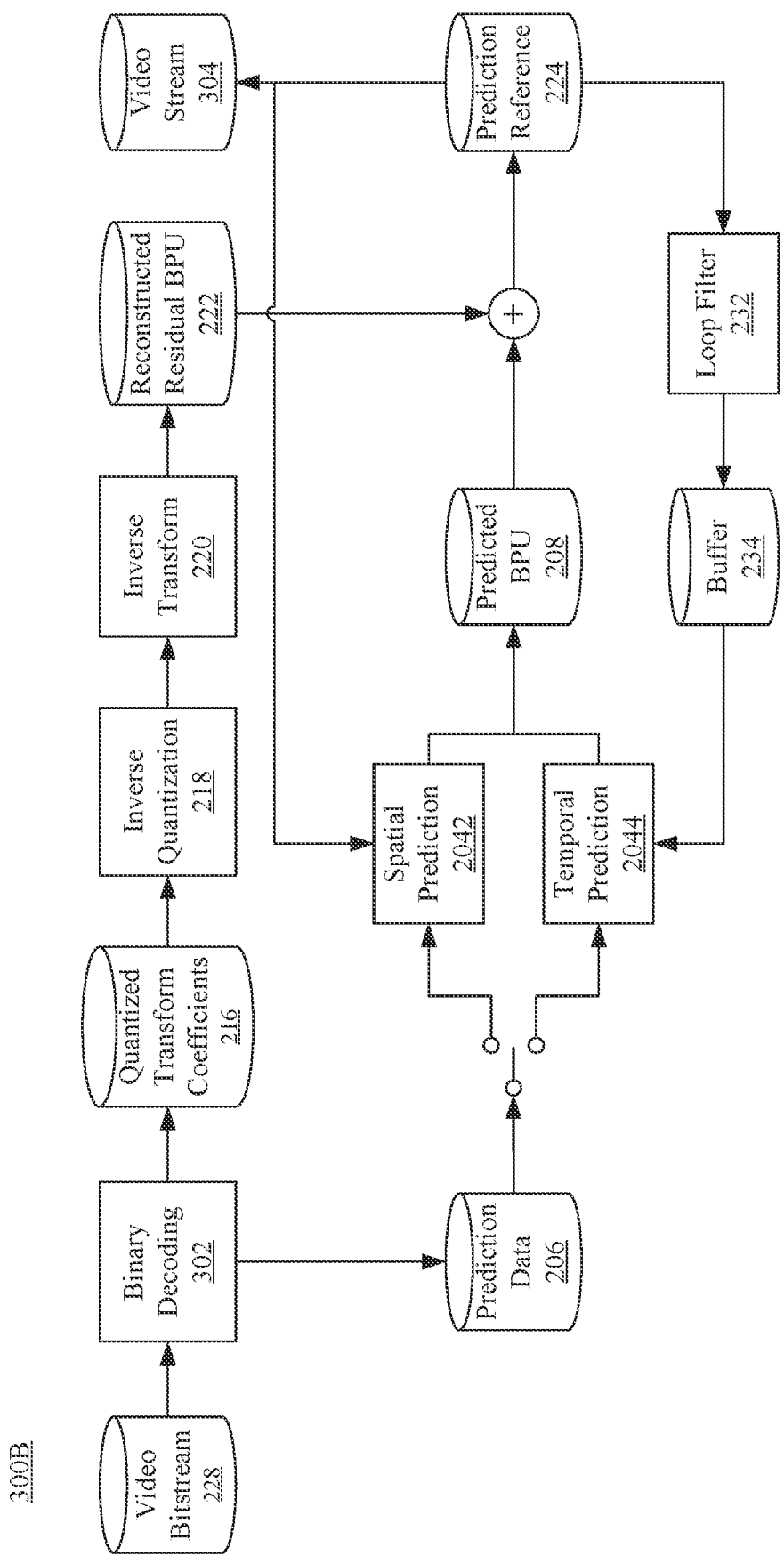
FIG. 3B illustrates a schematic diagram of another example decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU" or "target BPU") of an encoded picture (referred to as a "current picture" or "target picture") that is being decoded, prediction data 206 decoded from binary decoding stage 302 by the decoder can include various types of data, depending on what prediction mode was used to encode the target BPU by the encoder. For example, if intra prediction was used by the encoder to encode the target BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the target BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the target BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the target BPU is decoded using the intra prediction at spatial prediction stage 2042, after generating prediction reference 224 (e.g., the decoded target BPU), the decoder can directly feed prediction reference 224 to spatial prediction stage 2042 for later usage (e.g., for extrapolation of a next BPU of the target picture). If the target BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, when the prediction mode indicator of prediction data 206 indicates that inter prediction was used to encode the target BPU.

Figure 4:
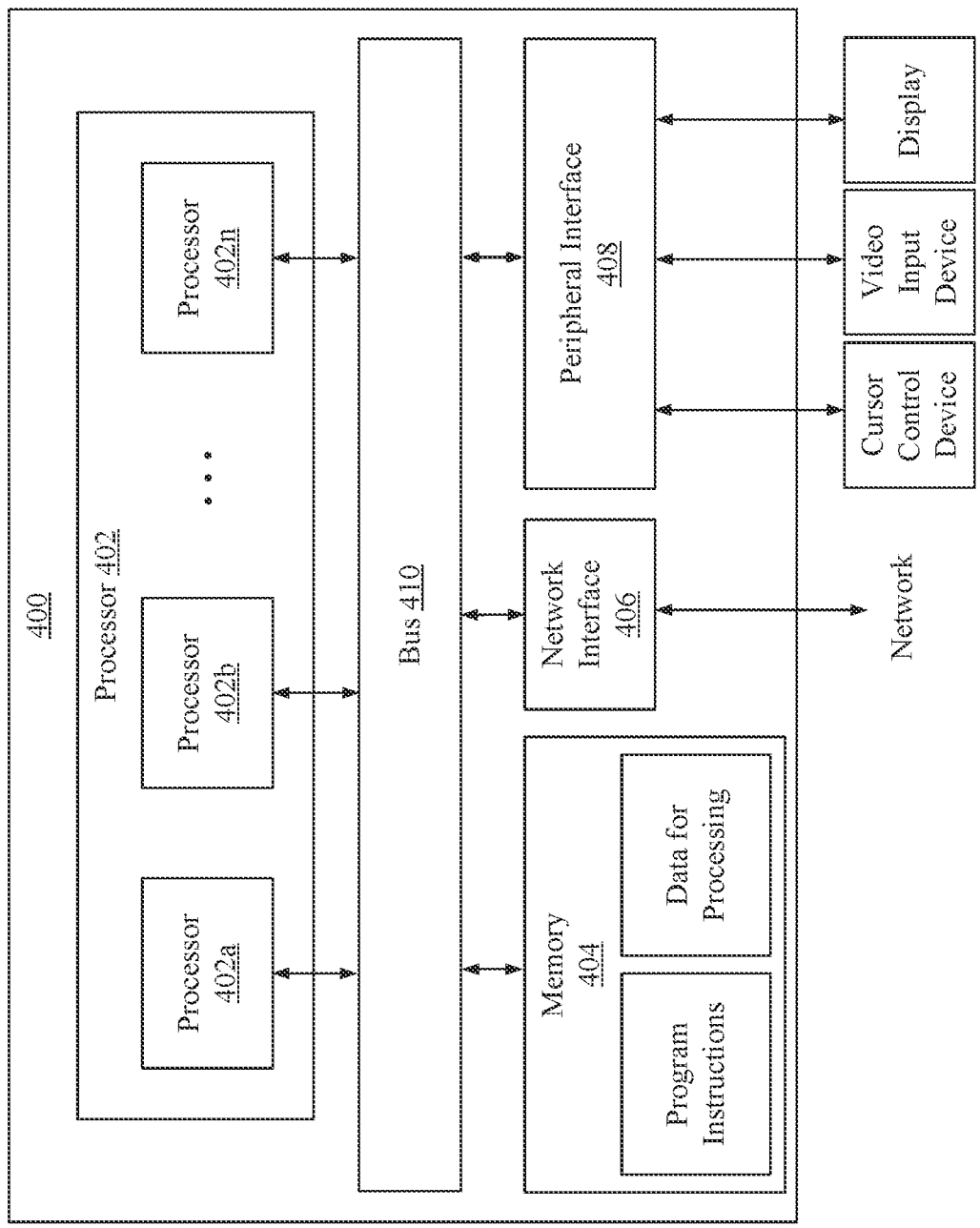
FIG. 4 illustrates a block diagram of an example apparatus for encoding or decoding a video, consistent with some embodiments of this disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

In the Versatile Video Coding (e.g., VVC/H.266) standard, a picture can be partitioned into a set of CTUs, and multiple CTUs can form a tile, a slice, or a subpicture. When a picture includes three sample arrays for storing three color components (e.g., a luma component and two chroma component), a CTU can include N×N (N being an integer) blocks of luma samples, each block of luma sample being associated with two blocks of chroma samples. Also, in the current VVC design (e.g., Benjamin Bross, Jianle Chen, and Shan Liu, "Versatile Video Coding (draft 8)," Doc. JVET-Q2001, Joint Video Experts Team (JVET) of ITU-T SG 16 WP 3 and ISO/IEC JTC 1/SC 29/WG 11, January 2020, or referred to as "VVC Draft 8" hereinafter), an adaptive loop filter (ALF) with block-based filter adaption is applied. For the luma component, for example, one among 25 filters can be selected for each 4×4 block based on a direction and an activity of local gradients. Further, in the current VVC design, a cross component adaptive loop filter (CCALF) can be adopted for video coding. The CCALF can operate in parallel with the ALF for luma components of a block.

Figure 5:
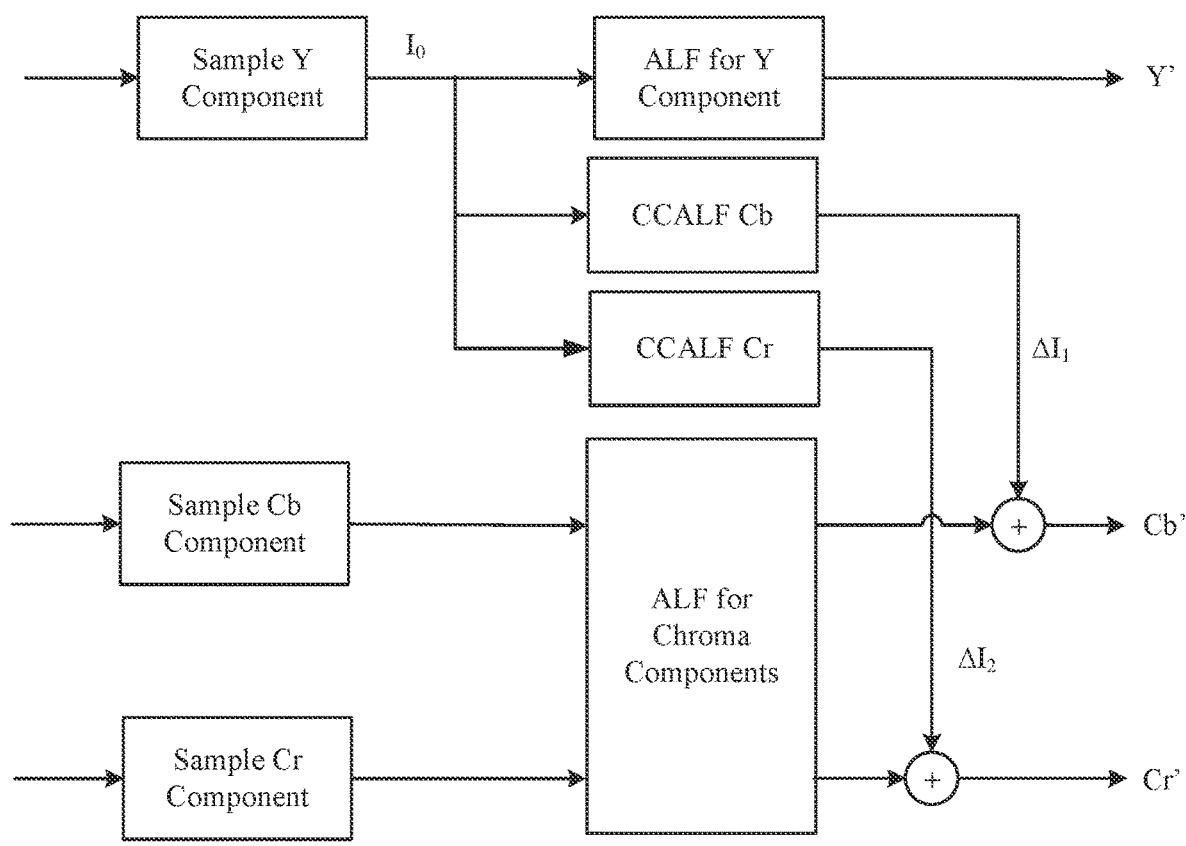
FIG. 5 is a schematic diagram illustrating an example cross component adaptive loop filter (CCALF) process, consistent with some embodiments of this disclosure.

By way of example, FIG. 5 is a schematic diagram illustrating an example cross component adaptive loop filter (CCALF) process 500, consistent with some embodiments of this disclosure. CCALF process 500 can be applied to a decoded sample (e.g., at loop filter stage 232 in FIG. 2B or FIG. 3B). The decoded sample can be applied with one or more loop filters, such as a deblocking filter followed by a sample adaptive offset ("SAO") filter. The decoded sample can have a luma component (shown as "Y Component" in FIG. 5) and two chroma components (shown as "Cb Component" and "Cr Component" in FIG. 5). As illustrated in FIG. 5, an ALF can be applied to all components (e.g., Y, Cb, and Cr) of the sample, represented as "ALF for Y Component" and "ALF for Chroma Components" in FIG. 5. In addition, CCALF process 500 can apply two CCALFs to a value (represented as "$I_0$" in FIG. 5) of the Y Component of the sample, represented as "CCALF Cb" and "CCALF Cr" in FIG. 5, respectively, for generating residual correction values (represented as "$\Delta I_1$" and "$\Delta I_2$" in FIG. 5, respectively) corresponding to the chroma components of the sample. The generated residual correction values (e.g., "$\Delta I_1$" and "$\Delta I_2$") can be added to the ALF-filtered chroma components, respectively, to generate the outputted loop-filtered chroma components of the sample. In some embodiments, the CCALFs (e.g., "CCALF Cb" and "CCALF Cr" in FIG. 5) can be linear filters.

Figure 6:
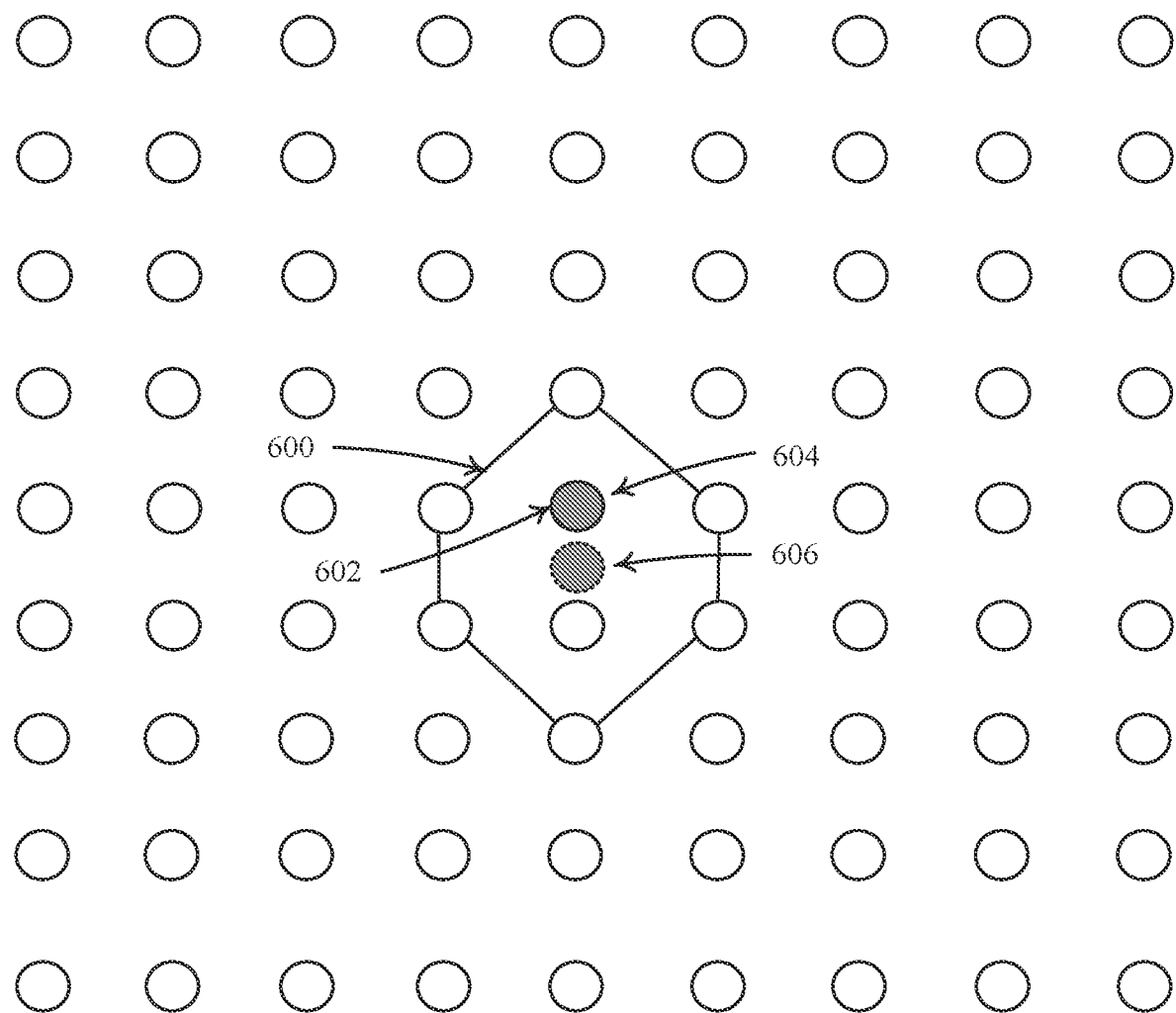
FIG. 6 is a schematic diagram illustrating an example 8-tap hexagon-shape filter for a CCALF, consistent with some embodiments of this disclosure.

In some embodiments, CCALF process 500 can use an 8-tap hexagon shaped filter. By way of example, FIG. 6 is a schematic diagram illustrating an example 8-tap hexagon-shape filter 600 for a CCALF, consistent with some embodiments of this disclosure. In FIG. 6, a white circle represents a luma component of a sample (or a "luma sample" for simplicity). Filter 600 covers 8 luma samples (including 6 white circles on the edge of a hexagon shape and 2 white circles inside the hexagon shape). A chroma component of the sample (or a "chroma sample" for simplicity) can be collocated with each luma sample. In some cases, the collocated chroma sample can have no vertical shift with respect to the luma sample. In some cases, the collocated chroma sample can have a vertical shift with respect to the luma sample. For example, as illustrated in FIG. 6, a chroma sample 604 (represented as a shaded circle with a solid-line edge) represents a case when the collocated chroma sample has no vertical shift with respect to a luma sample 602 (represented as a white circle superimposed by chroma sample 604), and a chroma sample 606 (represented as a shaded circle with a dot-line edge not overlapping with luma sample 602) represents a case when the collocated chroma sample has a vertical shift with respect to luma sample 602.

In some embodiments, the value of the vertical shift of the chroma sample with respect to the luma sample can be represented by a parameter in a parameter set. For example, in the current VVC design (e.g., VVC Draft 8), a flag "sps_chroma_vertical_collocated_flag" in a sequence parameter set (SPS) can indicate the vertical shift of the collocated chroma sample relative to the luma sample. The sps_chroma_vertical_collocated_flag being equal to 1 can specify that a prediction processes operates in a manner designed for chroma samples that have no vertical shift relative to corresponding luma samples. The sps_chroma_vertical_collocated_flag being equal to 0 can specify that the prediction processes operate in a manner designed for chroma samples that have a downward shift (e.g., by 0.5 in unit of a luma sample) relative to the corresponding luma samples. In some embodiments, when the sps_chroma_vertical_collocated_flag is not present in the SPS, its value can be inferred to be equal to 1.

In the current VVC design (e.g., VVC Draft 8), to remove multiplication, filter coefficients in the CCALF process (e.g., CCALF process 500 in FIG. 5) can be restricted to having values in the form of power of 2, such as from the following set: {−64, −32, −16, −8, −4, −2, −1, 0, 1, 2, 4, 8, 16, 32, 64}.

The above-described CCALF in the current VVC design (e.g., VVC Draft 8) faces some challenges in compression performance, virtual boundary consistency, and clipping. For example, the CCALF do not achieve optimal compression performance in some cases, especially when the sps_chroma_vertical_collocated_flag is equal to 1 because a filter shape of the CCALF is optimized for a case when sps_chroma_vertical_collocated_flag is equal to 0.

Moreover, in the current VVC design, the virtual boundary (both in ALF and CCALF processes) is defined as a horizontal CTU boundary 4 samples above the top row of the CTU below for a luma sample. Both ALF and CCALF processes use symmetry padding to avoid using samples below the virtual boundary when filtering samples above the virtual boundary, and to avoid using samples above the virtual boundary when filtering samples below the virtual boundary. In the virtual boundary processing of the current VVC design, the ALF shifting parameter value is 10 whereas the CCALF shifting parameter value is 7. The different shifting parameter values between ALF and CCALF processes introduced inconsistency between ALF and CCALF virtual boundary processing, which can cause potential problems in the coding process because the shifting parameter is the value used to normalize the filter coefficients in the existing ALF design.

Further, in the current VVC design, to guarantee that the filtered coefficients fall within the range of coded bit-depth, the ALF executes a clipping operation once. However, the CCALF executes two clipping operations after generating the residual correction values (e.g., "$\Delta I_1$" and "$\Delta I_2$" in FIG. 5). Because an encoder or a decoder that applies the CCALF need to implement both clipping operations, it can increase hardware cost for video coding.

The disclosed embodiments provide features that improve on the deficiencies of the conventional video coding technologies. For example, some embodiments of this disclosure provide different shapes for CCALF, which can improve the compression performance. Some embodiments of this disclosure provide modified design of shifting parameters of CCALF, which can make the virtual boundary processing of ALF and CCALF consistent. To achieve a consistent design between ALF and CCALF processes, in some embodiments, a single clipping operation can be used during the CCALF process.

Figure 7:
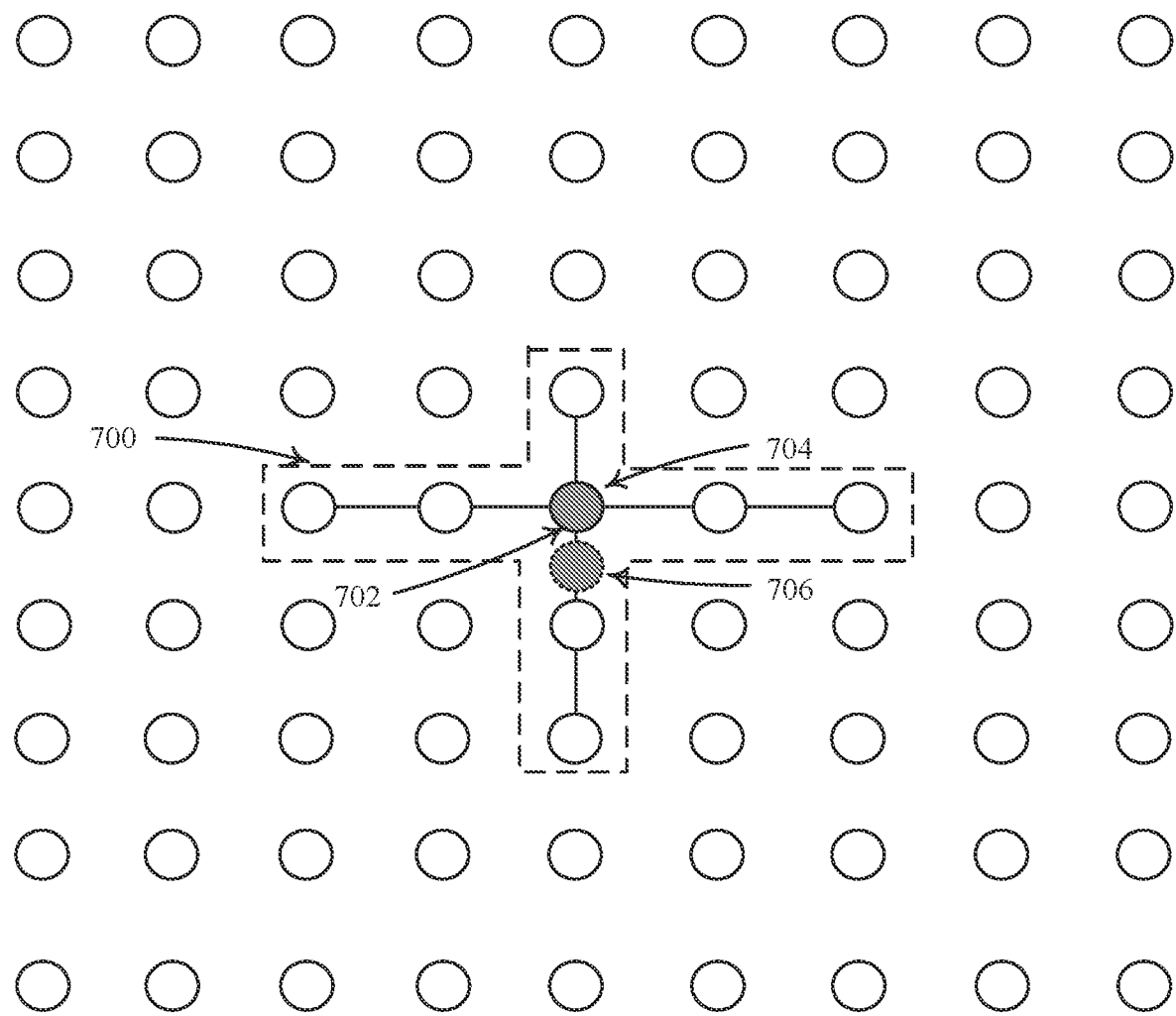
FIG. 7 is a schematic diagram illustrating an example 8-tap 5.4 cross-shape filter for a CCALF, consistent with some embodiments of this disclosure.

Consistent with some embodiments of this disclosure, an 8-tap 5×4 cross-shape filter can be used as the CCALF applicable to luma samples. Compared with the existing 8-tap 4×3 filter in VVC, widening the filter taps (e.g., from 4×3 to 5×4) can enable the filter to pass more high-frequency components, which can improve a compression rate of the processed signal. By way of example, FIG. 7 is a schematic diagram illustrating an example 8-tap 5×4 cross-shape filter 700 for a CCALF, consistent with some embodiments of this disclosure. Similar to FIG. 6, in FIG. 7, a white circle represents a luma sample. Filter 700 covers 8 luma samples arranged on a cross shape, represented by an area enclosed by a dash line. As illustrated in FIG. 7, a chroma sample 704 (represented as a shaded circle with a solid-line edge) represents a case when the collocated chroma sample of a luma sample 702 (represented as a white circle superimposed by chroma sample 704) has no vertical shift with respect to luma sample 702, and a chroma sample 706 (represented as a shaded circle with a dot-line edge not overlapping with luma sample 702) represents a case when the collocated chroma sample of luma sample 702 has a vertical shift with respect to luma sample 702.

In some embodiments, the 8-tap 5×4 cross-shape filter (e.g., filter 700 described in association with FIG. 7) can be incorporated in VVC or other video coding technologies. For example, the value of the vertical shift of the chroma sample with respect to the luma sample can be represented by the above-described flag "sps_chroma_vertical_collocated_flag." The sps_chroma_vertical_collocated_flag being equal to 1 can specify that a prediction processes operates in a manner designed for chroma samples that have no vertical shift relative to corresponding luma samples. The sps_chroma_vertical_collocated_flag being equal to 0 can specify that the prediction processes operate in a manner designed for chroma samples that have a downward shift (e.g., by 0.5 in unit of a luma sample) relative to the corresponding luma samples. In some embodiments, when the sps_chroma_vertical_collocated_flag is not present in the SPS, its value can be inferred to be equal to 1.

By way of example, FIG. 8 illustrates modified description in a VVC standard (e.g., VVC Draft 8) for a video coding process using an 8-tap 5×4 cross-shape filter (e.g., filter 700 in FIG. 7), consistent with some embodiments of this disclosure. For example, the video coding process can be process 200B of FIG. 2B or process 300B of FIG. 3B, and the 8-tap 5-4 cross-shape filter can be used at loop filter stage 232 in process 200B or 300B, respectively. FIG. 8 includes a dot-dash line box 802. In this disclosure, a dot-dash line box in the accompanying figures represents that the contents or elements enclosed therein are deleted or removed. FIG. 8 also includes italic-bold typeface for some texts (e.g., below box 802). In this disclosure, contents or elements shown in italic-bold typeface in the tables of the accompanying figures represents that they are added or inserted.

In some embodiments, when the video coding process uses an 8-tap 5×4 cross-shape filter (e.g., filter 700 in FIG.

7), the conditions to derive vertical sample position offsets (represented as parameters "yP1" and "yP2" in VVC) for handling boundary conditions can be the same as in current designs, such as in VVC Draft 8.

Figure 9:
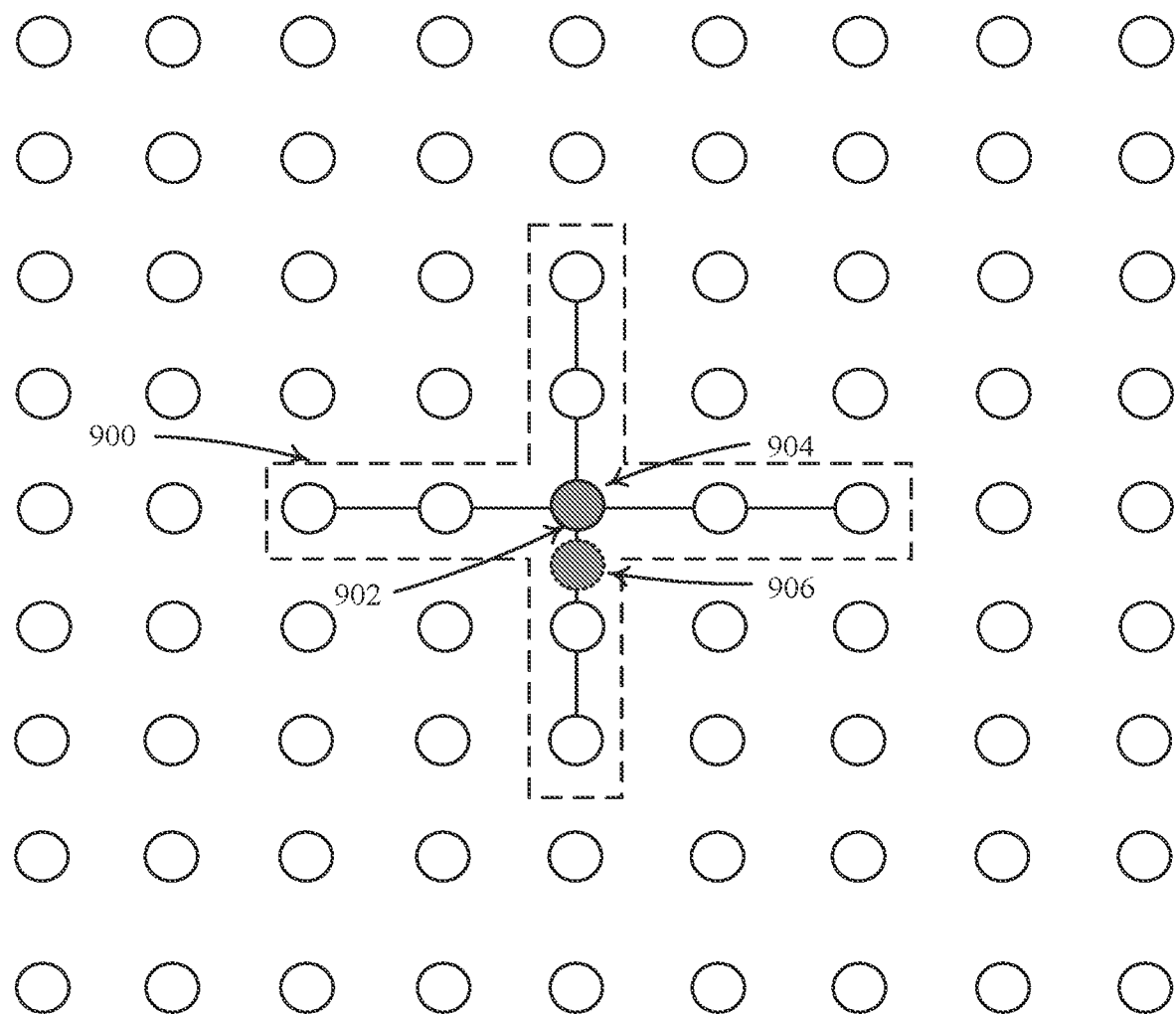
FIG. 9 is a schematic diagram illustrating an example 9-tap 5×5 cross-shape filter for a CCALF, consistent with some embodiments of this disclosure.

Consistent with some embodiments of this disclosure, a 9-tap 5×5 cross-shape filter can be used as the CCALF applicable to luma samples. Compared with the existing 8-tap 4-3 filter in VVC, increasing the number of the filter taps (e.g., from 8 to 9) can enable the filter to pass more high-frequency components, which can improve a compression rate of the processed signal. By way of example, FIG. 9 is a schematic diagram illustrating an example 9-tap 5×5 cross-shape filter 900 for a CCALF, consistent with some embodiments of this disclosure. Similar to FIG. 7, in FIG. 9, a white circle represents a luma sample. Filter 900 covers 9 luma samples arranged on a cross shape, represented by an area enclosed by a dash line. As illustrated in FIG. 9, a chroma sample 904 (represented as a shaded circle with a solid-line edge) represents a case when the collocated chroma sample of a luma sample 902 (represented as a white circle superimposed by chroma sample 904) has no vertical shift with respect to luma sample 902, and a chroma sample 906 (represented as a shaded circle with a dot-line edge not overlapping with luma sample 902) represents a case when the collocated chroma sample of luma sample 902 has a vertical shift with respect to luma sample 902.

In some embodiments, the 9-tap 5×5 cross-shape filter (e.g., filter 900 described in association with FIG. 9) can be incorporated in VVC or other video coding technologies. For example, the value of the vertical shift of the chroma sample with respect to the luma sample can be represented by the above-described flag "sps_chroma_vertical_collocated_flag." The sps_chroma_vertical_collocated_flag being equal to 1 can specify that a prediction processes operates in a manner designed for chroma samples that have no vertical shift relative to corresponding luma samples. The sps_chroma_vertical_collocated_flag being equal to 0 can specify that the prediction processes operates in a manner designed for chroma samples that have a downward shift (e.g., by 0.5 in unit of a luma sample) relative to the corresponding luma samples. In some embodiments, when the sps_chroma_vertical_collocated_flag is not present in the SPS, its value can be inferred to be equal to 1.

By way of example, FIG. 10 illustrates Table 1 of example adaptive loop filter (ALF) data syntax of a 9-tap 5×5 cross-shape filter (e.g., filter 900 in FIG. 9) for signaling filter coefficients, consistent with some embodiments of this disclosure. In some embodiments, the ALF data syntax can be included or signaled in an adaptation parameter set (APS). Compared with the ALF data syntax in VVC Draft 8, changes over VVC Draft 8 corresponding to the 9-tap 5×5 cross-shape filter are shown in Table 1. Table 1 includes a dot-dash line box 1002 in line 5 and a dot-dash line box 1004 in line 15, in which the portions are deleted. Table 1 also includes italic-bold typeface for some texts in line 5 (i.e., "8") and line 15 (i.e., "8"). As can be seen in Table 1, 8 filter coefficients are signaled, contrasting to the 7 filter coefficients signaled in some current VVC designs (e.g., VVC Draft 8).

By way of example, FIG. 11 illustrates modified description in a VVC standard (e.g., VVC Draft 8) for a video coding process using 9-tap 5-5 cross-shape filter (e.g., filter 900 in FIG. 9), consistent with some embodiments of this disclosure. For example, the video coding process can be process 200B of FIG. 2B or process 300B of FIG. 3B, and the 9-tap 5-5 cross-shape filter can be used at loop filter stage 232 in process 200B or 300B, respectively. FIG. 11 includes dot-dash line boxes 1102, 1104, and 1106, indicating language that has been removed. FIG. 11 also includes italic-bold typeface (denoting additions) for some texts (e.g., "7" on the right of box 1102, "7" on the right of box 1104, and some texts below box 1106).

In some embodiments, when the video coding process uses a 9-tap 5-5 cross-shape filter (e.g., filter 900 in FIG. 9), the conditions to derive vertical sample position offsets (represented as parameters "yP1" and "yP2" in VVC) for handling boundary conditions can be modified.

By way of example, FIG. 12 illustrates Table 2 of example specification of parameters "yP1" and "yP2" for handling boundary conditions associated with a 9-tap 5.5 cross-shape filter for a CCALF, consistent with some embodiments of this disclosure. For example, the specification of yP1 and yP2 can be based on the vertical luma sample positions (y*subHeightC) and applyAlfLineBufBoundary as defined in VVC Draft 8. FIG. 12 includes no dot-dash line box. FIG. 12 includes italic-bold typeface for some texts in line 3.

Figure 13A:
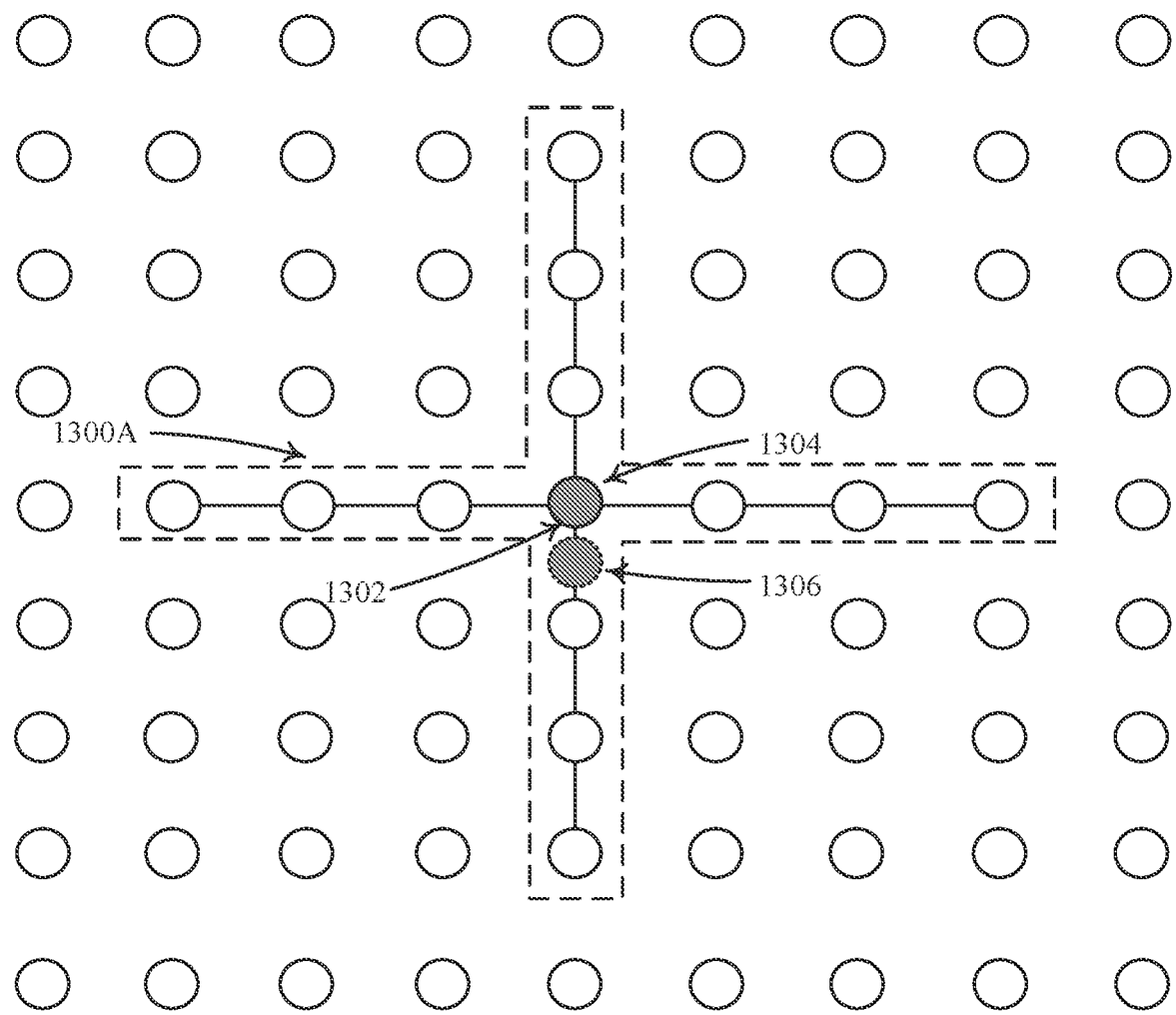
FIG. 13A is a schematic diagram illustrating an example 13-tap 7×7 cross-shape filter for a CCALF, consistent with some embodiments of this disclosure.

Consistent with some embodiments of this disclosure, a 13-tap 7×7 cross-shape filter can be used as the CCALF applicable to luma samples. Compared with the existing 8-tap 4×3 filter in VVC, widening the filter taps (e.g., from 4×3 to 7×7) and increasing the number of the filter taps (e.g., from 8 to 13) can enable the filter to pass more high-frequency components, which can improve a compression rate of the processed signal. By way of example, FIG. 13A is a schematic diagram illustrating an example 13-tap 7×7 cross-shape filter 1300A for a CCALF, consistent with some embodiments of this disclosure. Similar to FIG. 9, in FIG. 13A, a white circle represents a luma sample. Filter 1300A covers 13 luma samples arranged on a cross shape, represented by an area enclosed by a dash line. As illustrated in FIG. 13A, a chroma sample 1304 (represented as a shaded circle with a solid-line edge) represents a case when the collocated chroma sample of a luma sample 1302 (represented as a white circle superimposed by chroma sample 1304) has no vertical shift with respect to luma sample 1302, and a chroma sample 1306 (represented as a shaded circle with a dot-line edge not overlapping with luma sample 1302) represents a case when the collocated chroma sample of luma sample 1302 has a vertical shift with respect to luma sample 1302.

In some embodiments, the 13-tap 7×7 cross-shape filter (e.g., filter 1300A described in association with FIG. 13A) can be incorporated in VVC or other video coding technologies. For example, the value of the vertical shift of the chroma sample with respect to the luma sample can be represented by the above-described flag "sps_chroma_vertical_collocated_flag." The sps_chroma_vertical_collocated_flag being equal to 1 can specify that a prediction processes operates in a manner designed for chroma samples that have no vertical shift relative to corresponding luma samples. The sps_chroma_vertical_collocated_flag being equal to 0 can specify that the prediction processes operates in a manner designed for chroma samples that have a downward shift (e.g., by 0.5 in unit of a luma sample) relative to the corresponding luma samples. In some embodiments, when the sps_chroma_vertical_collocated_flag is not present in the SPS, its value can be inferred to be equal to 1.

Figure 13B:
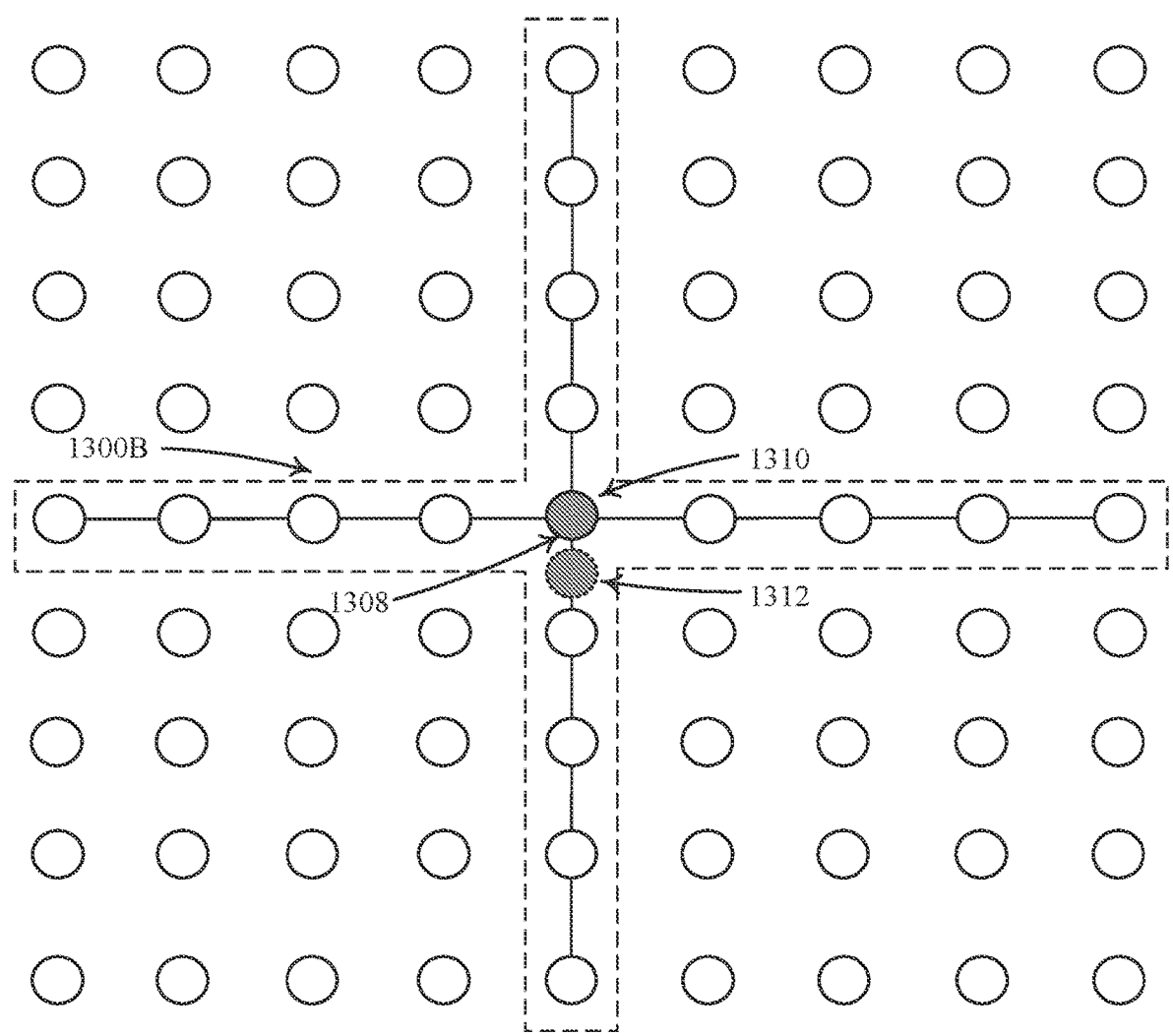
FIG. 13B is a schematic diagram illustrating an example 17-tap 9×9 cross-shape filter for a CCALF, consistent with some embodiments of this disclosure.

Consistent with some embodiments of this disclosure, a 17-tap 9×9 cross-shape filter can be used as the CCALF applicable to luma samples. Compared with the existing 8-tap 4×3 filter in VVC, widening the filter taps (e.g., from 4×3 to 9×9) and increasing the number of the filter taps (e.g., from 8 to 13) can enable the filter to pass more high-frequency components, which can improve a compression rate of the processed signal. By way of example, FIG. 13B is a schematic diagram illustrating an example 17-tap 9×9 cross-shape filter 1300B for a CCALF, consistent with some embodiments of this disclosure. Similar to FIG. 13A, in FIG. 13B, a white circle represents a luma sample. Filter 1300B covers 17 luma samples arranged on a cross shape, represented by an area enclosed by a dash line. As illustrated in FIG. 13B, a chroma sample 1310 (represented as a shaded circle with a solid-line edge) represents a case when the collocated chroma sample of a luma sample 1308 (represented as a white circle superimposed by chroma sample 1310) has no vertical shift with respect to luma sample 1308, and a chroma sample 1312 (represented as a shaded circle with a dot-line edge not overlapping with luma sample 1308) represents a case when the collocated chroma sample of luma sample 1308 has a vertical shift with respect to luma sample 1308.

By way of example, FIG. 14 illustrates Table 3 of example ALF data syntax of a 13-tap 7×7 cross-shape filter (e.g., filter 1300A in FIG. 13A) for signaling filter coefficients, consistent with some embodiments of this disclosure. In some embodiments, the ALF data syntax can be included or signaled in an adaptation parameter set (APS). Compared with the ALF data syntax in VVC Draft 8, changes over VVC Draft 8 corresponding to the 13-tap 7×7 cross-shape filter are shown in Table 3. Table 3 includes a dot-dash line box 1402 in line 5 and a dot-dash line box 1404 in line 15. Table 3 also includes italic-bold typeface for some texts in line 5 (i.e., "12") and line 15 (i.e., "12"). As can be seen in Table 3, 12 filter coefficients are signaled, contrasting to the 7 filter coefficients signaled in some current VVC designs (e.g., VVC Draft 8).

By way of example, FIG. 15 illustrates modified description in a VVC standard (e.g., VVC Draft 8) for a video coding process using 13-tap 7×7 cross-shape filter (e.g., filter 1300A in FIG. 13A), consistent with some embodiments of this disclosure. For example, the video coding process can be process 200B of FIG. 2B or process 300B of FIG. 3B, and the 13-tap 7×7 cross-shape filter can be used at loop filter stage 232 in process 200B or 300B, respectively. FIG. 15 includes dot-dash line boxes 1502, 1504, 1506, and 1508. FIG. 15 also includes italic-bold typeface for some texts (e.g., "11" on the right of box 1502, "11" on the right of box 1504, some texts below box 1506, and "yP1, yP2 and yP3" on the right of box 1508).

In some embodiments, when the video coding process uses a 13-tap 7×7 cross-shape filter (e.g., filter 1300A in FIG. 13A), the conditions to derive vertical sample position offsets (represented as parameters "yP1," "yP2," and "yP3") for handling boundary conditions can be modified.

By way of example, FIG. 16 illustrates Table 4 of example specification of parameters "yP1," "yP2," and "yP3" for handling boundary conditions associated with a 13-tap 7×7 cross-shape filter for a CCALF, consistent with some embodiments of this disclosure. For example, the specification of yP1, yP2, and yP3 can be based on the vertical luma sample positions (y*subHeightC) and applyAlfLineBufBoundary as defined in VVC Draft 8. FIG. 16 includes no dot-dash line box. FIG. 16 includes italic-bold typeface for texts in line 4. Table 4 introduces a new column with a heading "yP3."

Figure 17:
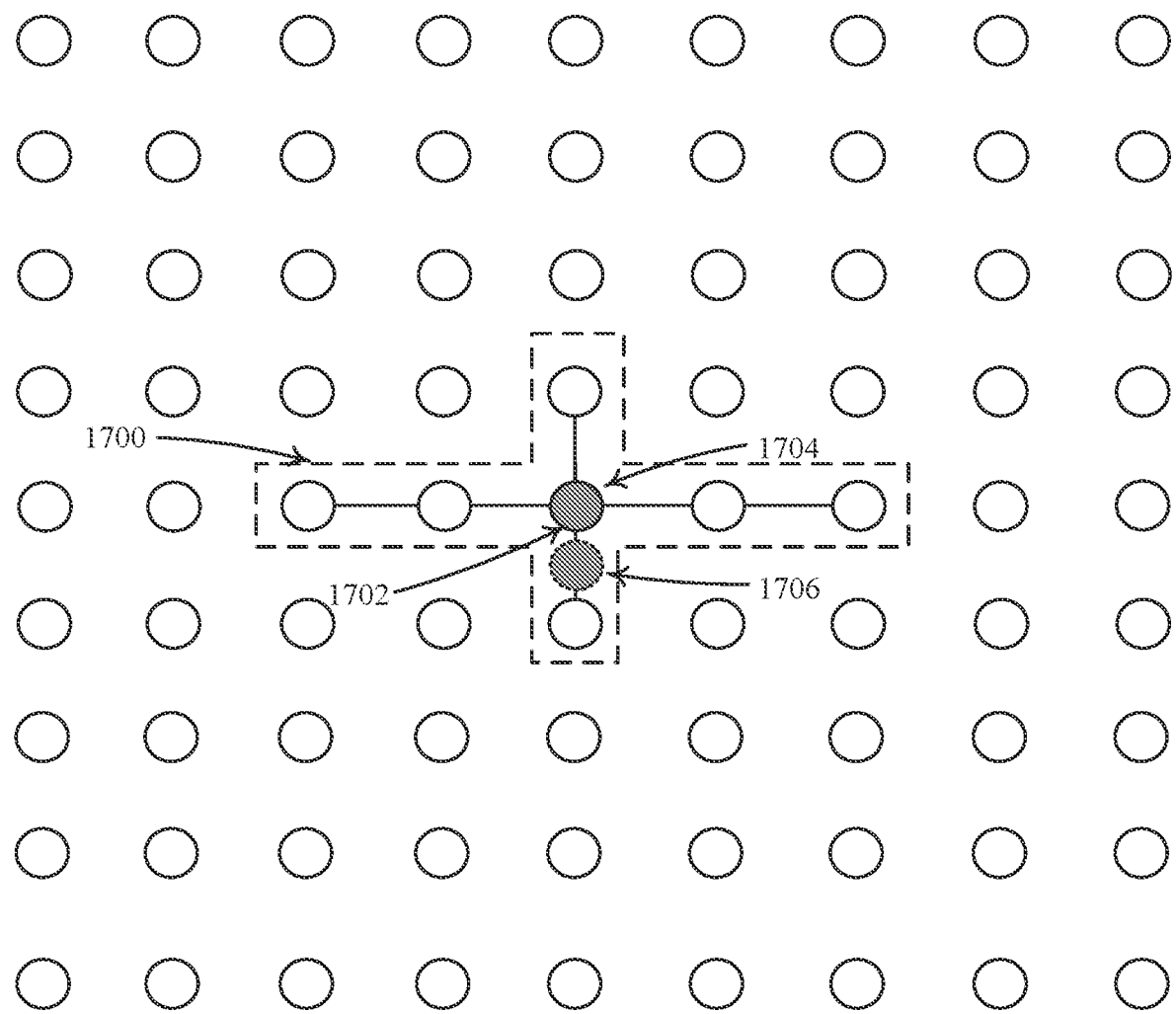
FIG. 17 is a schematic diagram illustrating an example 7-tap 5-3 cross-shape filter for a CCALF, consistent with some embodiments of this disclosure.

Consistent with some embodiments of this disclosure, a 7-tap 5×3 cross-shape filter can be used as the CCALF applicable to luma samples. Compared with the existing 8-tap 4×3 filter in VVC, widening the filter taps (e.g., from 4×3 to 5×3) can enable the filter to pass more high-frequency components, and decreasing the number of taps (e.g., from 8 to 7) can lower implementation cost, by which a compression rate of the processed signal can be improved without incurring significant implementation costs. By way of example, FIG. 17 is a schematic diagram illustrating an example 7-tap 5×3 cross-shape filter 1700 for a CCALF, consistent with some embodiments of this disclosure. Similar to FIG. 13A, in FIG. 17, a white circle represents a luma sample. Filter 1700 covers 7 luma samples arranged on a cross shape, represented by an area enclosed by a dash line. As illustrated in FIG. 17, a chroma sample 1704 (represented as a shaded circle with a solid-line edge) represents a case when the collocated chroma sample of a luma sample 1702 (represented as a white circle superimposed by chroma sample 1704) has no vertical shift with respect to luma sample 1702, and a chroma sample 1706 (represented as a shaded circle with a dot-line edge not overlapping with luma sample 1702) represents a case when the collocated chroma sample of luma sample 1702 has a vertical shift with respect to luma sample 1702.

In some embodiments, the 7-tap 5-3 cross-shape filter (e.g., filter 1700 described in association with FIG. 17) can be incorporated in VVC or other video coding technologies. For example, the value of the vertical shift of the chroma sample with respect to the luma sample can be represented by the above-described flag "sps_chroma_vertical_collocated_flag." The sps_chroma_vertical_collocated_flag being equal to 1 can specify that a prediction processes operates in a manner designed for chroma samples that have no vertical shift relative to corresponding luma samples. The sps_chroma_vertical_collocated_flag being equal to 0 can specify that the prediction processes operates in a manner designed for chroma samples that have a downward shift (e.g., by 0.5 in unit of a luma sample) relative to the corresponding luma samples. In some embodiments, when the sps_chroma_vertical_collocated_flag is not present in the SPS, its value can be inferred to be equal to 1.

By way of example, FIG. 18 illustrates Table 5 of example ALF data syntax of a 7-tap 5×3 cross-shape filter (e.g., filter 1700 in FIG. 17) for signaling filter coefficients, consistent with some embodiments of this disclosure. In some embodiments, the ALF data syntax can be included or signaled in an adaptation parameter set (APS). Compared with the ALF data syntax in VVC Draft 8, changes over VVC Draft 8 corresponding to the 7-tap 5×3 cross-shape filter are shown in Table 5. Table 5 includes a dot-dash line box 1802 in line 5 and a dot-dash line box 1804 in line 15. Table 5 also includes italic-bold typeface for some texts in line 5 (i.e., "6") and line 15 (i.e., "6"). As can be seen in Table 5, 6 filter coefficients are signaled, contrasting to the 7 filter coefficients signaled in some current VVC designs (e.g., VVC Draft 8).

By way of example, FIG. 19 illustrates modified description in a VVC standard (e.g., VVC Draft 8) for a video coding process using a 7-tap 5×3 cross-shape filter (e.g., filter 1700 in FIG. 17), consistent with some embodiments of this disclosure. For example, the video coding process can be process 200B of FIG. 2B or process 300B of FIG. 3B, and the 7-tap 5×3 cross-shape filter can be used at loop filter stage 232 in process 200B or 300B, respectively. FIG. 19 includes dot-dash line boxes 1902 and 1904. FIG. 19 also includes italic-bold typeface for some texts (e.g., some texts below box 1904).

In some embodiments, when the video coding process uses a 7-tap 5×3 cross-shape filter (e.g., filter 1700 in FIG. 17), the conditions to derive vertical sample position offsets (represented as parameters "yP1") for handling boundary conditions can be modified. By way of example, FIG. 20 illustrates Table 6 of example specification of parameters "yP1" for handling boundary conditions associated with a 7-tap 5-3 cross-shape filter for a CCALF, consistent with some embodiments of this disclosure. For example, the specification of yP1 can be based on the vertical luma sample positions (y*subHeightC) and apply AlfLineBufBoundary as defined in VVC Draft 8. FIG. 20 includes a dot-dash line box 2002 and a dot-dash line box 2004.

Figure 21:
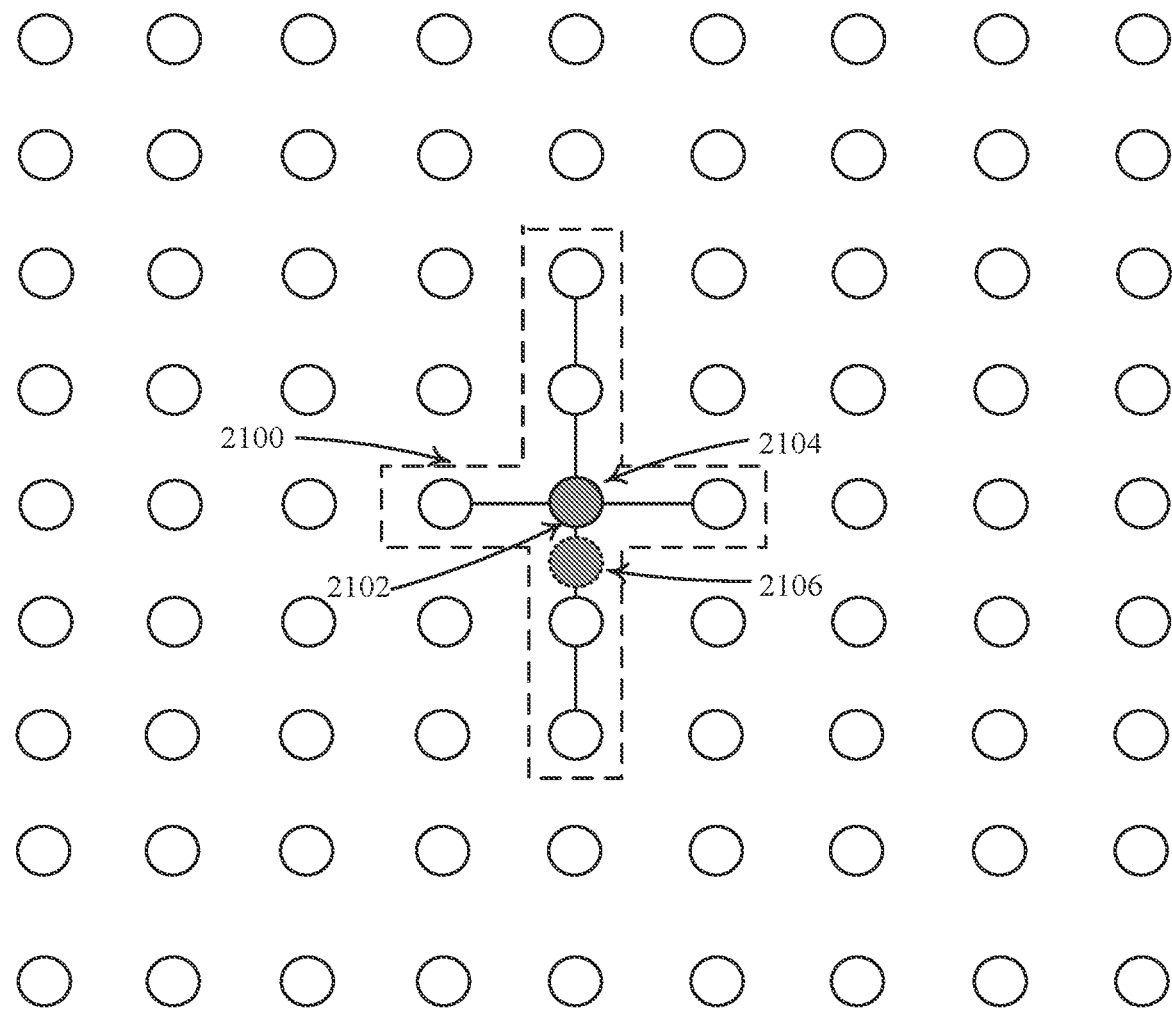
FIG. 21 is a schematic diagram illustrating an example 7-tap 3×5 cross-shape filter for a CCALF, consistent with some embodiments of this disclosure.

Consistent with some embodiments of this disclosure, a 7-tap 3×5 cross-shape filter can be used as the CCALF applicable to luma samples. Compared with the existing 8-tap 4×3 filter in VVC, widening the filter taps (e.g., from 4×3 to 3×5) can enable the filter to pass more high-frequency components, and decreasing the number of taps (e.g., from 8 to 7) can lower implementation cost, by which a compression rate of the processed signal can be improved without incurring significant implementation costs. By way of example, FIG. 21 is a schematic diagram illustrating an example 7-tap 3×5 cross-shape filter 2100 for a CCALF, consistent with some embodiments of this disclosure. Similar to FIG. 17, in FIG. 21, a white circle represents a luma sample. Filter 2100 covers 7 luma samples arranged on a cross shape, represented by an area enclosed by a dash line. As illustrated in FIG. 21, a chroma sample 2104 (represented as a shaded circle with a solid-line edge) represents a case when the collocated chroma sample of a luma sample 2102 (represented as a white circle superimposed by chroma sample 2104) has no vertical shift with respect to luma sample 2102, and a chroma sample 2106 (represented as a shaded circle with a dot-line edge not overlapping with luma sample 2102) represents a case when the collocated chroma sample of luma sample 2102 has a vertical shift with respect to luma sample 2102.

In some embodiments, the 7-tap 3×5 cross-shape filter (e.g., filter 2100 described in association with FIG. 21) can be incorporated in VVC or other video coding technologies. For example, the value of the vertical shift of the chroma sample with respect to the luma sample can be represented by the above-described flag "sps_chroma_vertical_collocated_flag." The sps_chroma_vertical_collocated_flag being equal to 1 can specify that a prediction processes operates in a manner designed for chroma samples that have no vertical shift relative to corresponding luma samples. The sps_chroma_vertical_collocated_flag being equal to 0 can specify that the prediction processes operates in a manner designed for chroma samples that have a downward shift (e.g., by 0.5 in unit of a luma sample) relative to the corresponding luma samples. In some embodiments, when the sps_chroma_vertical_collocated_flag is not present in the SPS, its value can be inferred to be equal to 1.

By way of example, FIG. 22 illustrates Table 7 of example ALF data syntax of a 7-tap 5×3 cross-shape filter (e.g., filter 2100 in FIG. 21) for signaling filter coefficients, consistent with some embodiments of this disclosure. Table 7 can be the same as Table 5 in FIG. 18. In some embodiments, the ALF data syntax can be included or signaled in an adaptation parameter set (APS). Compared with the ALF data syntax in VVC Draft 8, changes over VVC Draft 8 corresponding to the 7-tap 5×3 cross-shape filter are shown in Table 7. Table 7 includes a dot-dash line box 2202 in line 5 and a dot-dash line box 2204 in line 15. Table 7 also includes italic-bold typeface for some texts in line 5 (i.e., "6") and line 15 (i.e., "6"). As can be seen in Table 7, 6 filter coefficients are signaled, contrasting to the 7 filter coefficients signaled in some current VVC designs (e.g., VVC Draft 8).

By way of example, FIG. 23 illustrates modified description in a VVC standard (e.g., VVC Draft 8) for a video coding process using a 7-tap 3×5 cross-shape filter (e.g., filter 2100 in FIG. 21), consistent with some embodiments of this disclosure. For example, the video coding process can be process 200B of FIG. 2B or process 300B of FIG. 3B, and the 7-tap 3-5 cross-shape filter can be used at loop filter stage 232 in process 200B or 300B, respectively. FIG. 23 includes dot-dash line boxes 2302, 2304, and 2306. FIG. 23 also includes italic-bold typeface for some texts (e.g., "5" on the right of box 2302, "5" on the right of box 2304, and some texts below box 2306).

In some embodiments, when the video coding process uses a 7-tap 3×5 cross-shape filter (e.g., filter 2100 in FIG. 21), the conditions to derive vertical sample position offsets (represented as parameters "yP1" and "yP2") for handling boundary conditions can be modified. By way of example, FIG. 24 illustrates Table 8 of example specification of parameters "yP1" for handling boundary conditions associated with a 7-tap 3×5 cross-shape filter for a CCALF, consistent with some embodiments of this disclosure. For example, the specification of yP1 can be based on the vertical luma sample positions (y*subHeightC) and apply AlfLineBufBoundary as defined in VVC Draft 8. FIG. 24 includes no dot-dash line box. Table 8 includes italic-bold typeface for texts in line 3.

Consistent with some embodiments of this disclosure, two filters can be used in the CCALF process. The two filters can be controlled by a value of a parameter (e.g., the "sps_chroma_vertical_collocated_flag" flag described herein). For example, when the value of the parameter is equal to 0, a filter having a first shape (e.g., filter 600 in FIG. 6) can be used for the CCALF process. In another example, when the value of the parameter is equal to 1, a filter having a second shape (e.g., filter 1700 in FIG. 17) can be used for the CCALF process. It should be noted that the shapes of the two filters can be various and not limited to the example embodiments described herein.

Figure 25B:
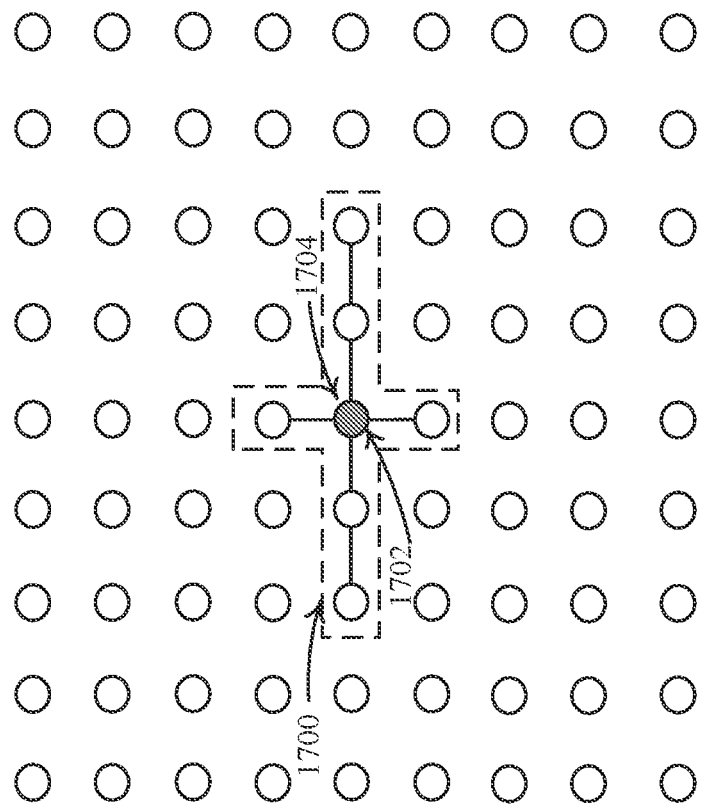
FIGS. 25A and 25B are schematic diagrams illustrating two example controllable filters for a CCALF, consistent with some embodiments of this disclosure.
Figure 25A:
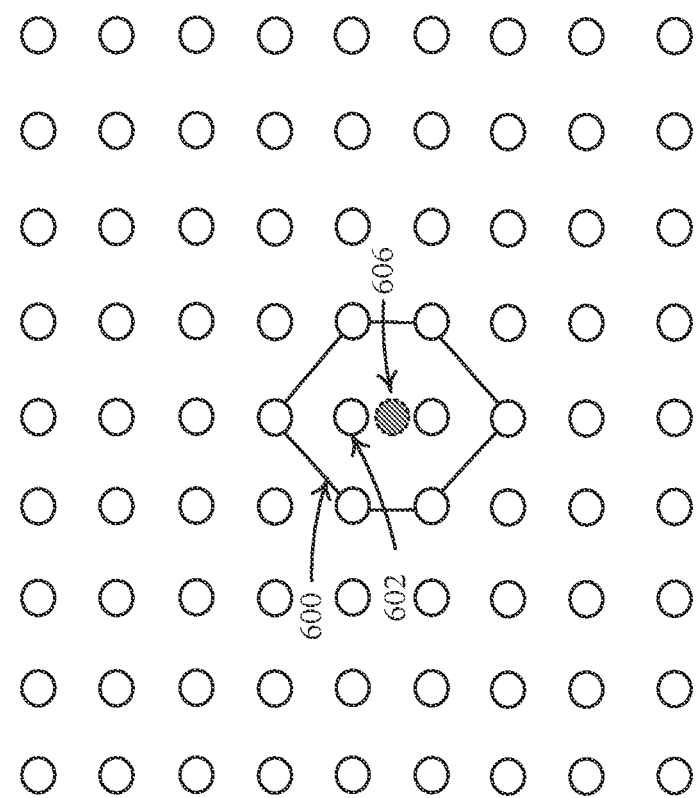

By way of example, FIGS. 25A and 25B are schematic diagrams illustrating two example controllable filters for a CCALF, consistent with some embodiments of this disclosure. FIG. 25A and FIG. 25B are similar to FIG. 6 and FIG. 17, respectively. The filters of FIGS. 25A and 25B can be incorporated in VVC or other video coding technologies. In FIG. 25A, the value of the "sps_chroma_vertical_collocated_flag" flag is equal to 0, which represents that chroma sample 606 has a vertical shift with respect to luma sample 602 (represented as a white circle), and filter 600 can be used for the CCALF process. In FIG. 25B, the value of the "sps_chroma_vertical_collocated_flag" flag is equal to 1, which represents that chroma sample 1704 has no vertical shift with respect to a luma sample 1702, and filter 1700 in can be used for the CCALF process.

Figure 26B:
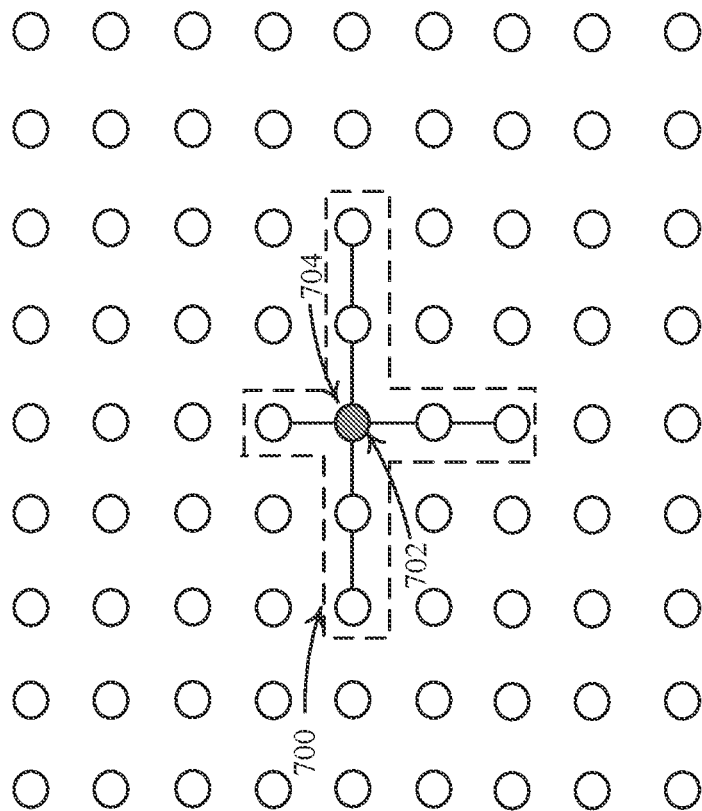
FIGS. 26A and 26B are schematic diagrams illustrating two other example controllable filters for a CCALF, consistent with some embodiments of this disclosure.
Figure 26A:
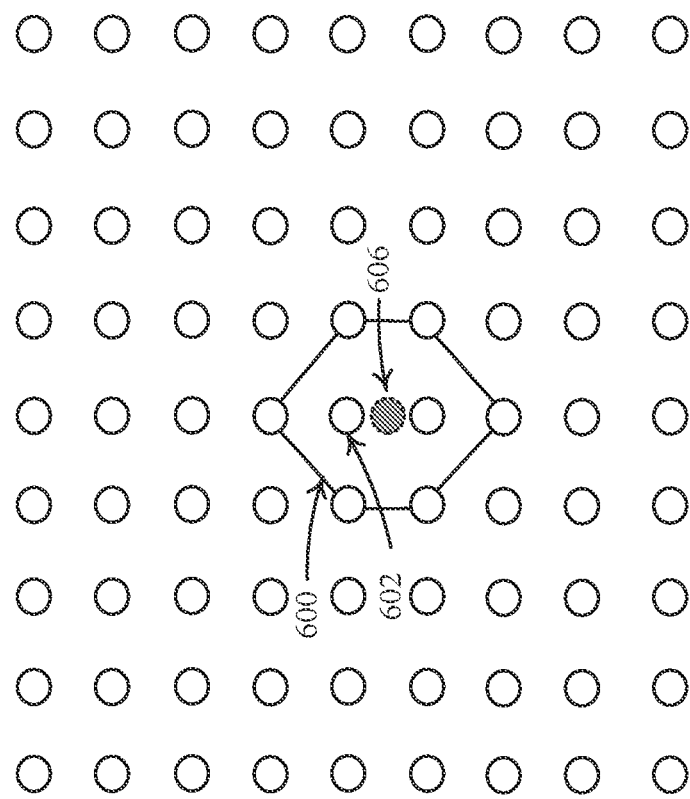

By way of example, FIGS. 26A and 26B are schematic diagrams illustrating two other example controllable filters for a CCALF, consistent with some embodiments of this disclosure. FIG. 26A and FIG. 26B are similar to FIG. 6 and FIG. 7, respectively. The filters of FIGS. 26A and 26B can be incorporated in VVC or other video coding technologies. In FIG. 26A, the value of the "sps_chroma_vertical_collocated_flag" flag is equal to 0, which represents that chroma sample 606 has a vertical shift with respect to luma sample 602 (represented as a white circle), and filter 600 can be used for the CCALF process. In FIG. 26B, the value of the "sps_chroma_vertical_collocated_flag" flag is equal to 1, which represents that chroma sample 704 has no vertical shift with respect to a luma sample 702, and filter 700 in can be used for the CCALF process.

By way of example, FIG. 27 illustrates a table of example ALF data syntax of two example controllable filters (e.g., the filters in FIGS. 25A and 25B, or the filters in FIGS. 26A and 25B) for signaling filter coefficients, consistent with some embodiments of this disclosure. In some embodiments, the ALF data syntax can be included or signaled in an adaptation parameter set (APS). Compared with the ALF data syntax in VVC Draft 8, changes over VVC Draft 8 corresponding to two controllable filters are shown in Table 9. Table 9 includes a dot-dash line box 2702 in line 6 and a dot-dash line box 2704 in line 16. Table 9 also includes italic-bold typeface for a new line 3, some texts in line 6 (i.e., the variable "numccalfFilterCoeffminus1" on the right of box 2702), and line 16 (i.e., the variable "numccalfFilterCoeffminus1" on the right of box 2704). As can be seen in Table 9, contrasting to the 7 filter coefficients signaled in some current VVC designs (e.g., VVC Draft 8), the number of CCALF filter coefficients minus 1 (i.e., "numccalfFilterCoeffminus1") can depend on "sps_chroma_vertical_collocated_flag." As illustrated in line 3 of Table 9, if "sps_chroma_vertical_collocated_flag" is equal to 1, "numccalfFilterCoeffminus1" can have a value of 6. Otherwise, if "sps_chroma_vertical_collocated_flag" is not equal to 1, "numccalfFilterCoeffminus1" can have a value of 7. In this way, the ALF data syntax can be adaptive to the two controllable filters.

By way of example, FIG. 28 illustrates modified description in a VVC standard (e.g., VVC Draft 8) for a video coding process using two example controllable filters (the filters in FIGS. 25A and 25B), consistent with some embodiments of this disclosure. For example, the video coding process can be process 200B of FIG. 2B or process 300B of FIG. 3B, and the two controllable filters can be used at loop filter stage 232 in process 200B, 300B, or both processes 200B and 300B. FIG. 28 includes dot-dash line boxes 2802 and 2804. FIG. 23 also includes italic-bold typeface for some texts (e.g., "numccalfFilterCoeffminus1" on the right of box 2802, "numccalfFilterCoeffminus1" on the right of box 2804, and some texts below box 2804).

By way of example, FIG. 29 illustrates modified description for a video coding process using two other example controllable filters (the filters in FIGS. 26A and 26B), consistent with some embodiments of this disclosure. For example, the video coding process can be process 200B of FIG. 2B or process 300B of FIG. 3B, and the two other controllable filters can be used at loop filter stage 232 in process 200B, 300B, or both processes 200B and 300B. FIG. 29 includes no dot-dash line box. FIG. 29 includes italic-bold typeface for some texts (e.g., some texts below Equation (1531)).

In some embodiments, when the video coding process uses two filters that can be controlled by a value of a parameter (e.g., the filter in FIGS. 25A and 25B, or the filters in FIGS. 26A and 25B), the conditions to derive vertical sample position offsets (represented as parameters "yP1" and "yP2" in VVC) for handling boundary conditions can be the same as in current designs, such as in VVC Draft 8.

Consistent with some embodiments of this disclosure, to achieve consistent virtual boundary processing between ALF and CCALF, the shifting parameter value of CCALF can be changed to be the same as the shifting parameter value of ALF. For example, the shifting parameter value of CCALF can be changed from 7 to 10.

By way of example, FIG. 30 illustrates modified description in a VVC standard (e.g., VVC Draft 8) for a cross-component filtering process, consistent with some embodiments of this disclosure. FIG. 30 includes a dot-dash line box 3002. FIG. 30 also includes italic-bold typeface for some texts (e.g., "alfShiftY" on the right of box 3002). The variable "alfShiftY" represents a shifting parameter for an ALF process.

By way of example, FIG. 31 illustrates Table 10 of example specification of parameters "yP1," "yP2," and "alfShiftY" (e.g., the "alfShiftY" in FIG. 30) for handling boundary conditions associated with a modified cross-component filtering process of a CCALF, consistent with some embodiments of this disclosure. For example, the specification of yP1, yP2, and alfShiftY can be based on the vertical luma sample positions (y*subHeightC) and applyAlfLineBufBoundary as defined in VVC Draft 8. FIG. 31 includes no dot-dash line box. Table 10 introduces a new column with a heading "alfShiftY." As a comparison, FIG. 32 illustrates Table 11 of specification of parameters "yP1," "yP2," and "alfShiftY" (e.g., the "alfShifY" in FIG. 30) of an ALF process in VVC Draft 8.

Consistent with some embodiments of this disclosure, to make the clipping operation consistent between the ALF and the CCALF, one clipping operation can be removed from the CCALF process.

By way of example, FIG. 33 illustrates modified description in a VVC standard (e.g., VVC Draft 8) associated with a clipping operation in a cross-component filtering process, consistent with some embodiments of this disclosure. FIG. 33 includes a dot-dash line shape 3302. FIG. 33 also includes italic-bold typeface for some texts (e.g., the text on the right of shape 3302 in Equation (1534)).

Figure 34:
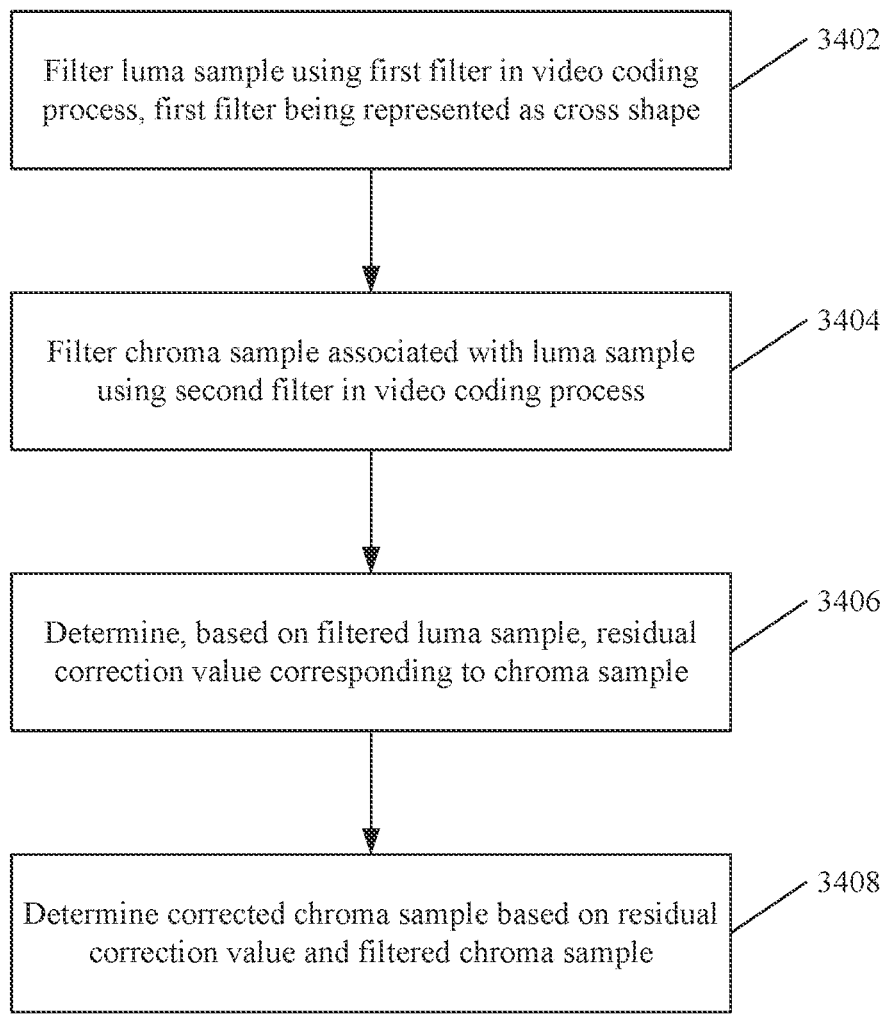
FIG. 34 illustrates a flowchart of an example process for video processing, consistent with some embodiments of this disclosure.

Consistent with some embodiments of this disclosure, FIG. 34 illustrates a flowchart of a process 3400 for video processing, consistent with some embodiments of this disclosure. In some embodiments, process 3400 can be performed by a codec (e.g., an encoder in FIGS. 2A-2B or a decoder in FIGS. 3A-3B). For example, the codec can be implemented as one or more software or hardware components of an apparatus (e.g., apparatus 400) for controlling a coding mode of encoding or decoding a video sequence, such as a processor (e.g., processor 402) of the apparatus.

At step 3402, a processor (e.g., processor 402 in FIG. 4) can filter a luma sample using a first filter in a video coding process, in which the first filter can be represented as a cross shape. For example, the luma sample can be luma sample 702 in FIG. 7, luma sample 902 in FIG. 9, luma sample 1302 in FIG. 13A, luma sample 1702 in FIG. 17, or luma sample 2102 in FIG. 21, and the first filter can be filter 700 in FIG. 7, filter 900 in FIG. 9, filter 1300A in FIG. 13A, filter 1700 in FIG. 17, or filter 2100 in FIG. 21, respectively.

At step 3404, the processor can filter a chroma sample associated with the luma sample using a second filter in the video coding process. For example, the chroma sample can be chroma sample 704 in FIG. 7, chroma sample 904 in FIG. 9, chroma sample 1304 in FIG. 13A, chroma sample 1704 in FIG. 17, or chroma sample 2104 in FIG. 21.

In some embodiments, the first filter can be a cross component adaptive loop filter (CCALF), and the second filter can be an adaptive loop filter (ALF). In some embodiments, the first filter can be one of an 8-tap 5×4 cross-shape loop filter, a 9-tap 5-5 cross-shape loop filter, a 13-tap 7×7 cross-shape loop filter, a 7-tap 5×3 cross-shape loop filter, a 7-tap 3-5 cross-shape loop filter, or a 17-tap 9-9 cross-shape loop filter.

At step 3406, the processor can determine, based on the filtered luma sample, a residual correction value corresponding to the chroma sample. For example, if the chroma sample is a Cb sample or a Cr sample, the residual correction value can be the value "$\Delta I_1$" or "$\Delta I_2$" in FIG. 5, respectively.

At step 3408, the processor can determine a corrected chroma sample based on the residual correction value and the filtered chroma sample. In some embodiments, the processor can determine the corrected chroma sample by adding the residual correction value to the filtered chroma sample. For example, if the chroma sample is a Cb sample or a Cr sample, the corrected chroma sample can be the corrected Cb' sample or the corrected Cr' sample in FIG. 5, respectively.

Consistent with some embodiments of this disclosure, before, after, or during process 3400, the processor can further receive a parameter (e.g., the "sps_chroma_vertical_collocated_flag" flag as described herein) from a parameter set (e.g., an SPS) associated with the luma sample. In response to the parameter having a first value (e.g., 1), the processor can determine that the chroma sample (e.g., chroma sample 1704 in FIG. 25B or chroma sample 704 in FIG. 26B) is not vertically shifted from the luma sample. In response to the parameter having a second value (e.g., 0), the processor can determine that the chroma sample (e.g., chroma sample 606 in FIG. 25A or FIG. 26A) is vertically shifted from the luma sample for a distance (e.g., by 0.5 in unit of a luma sample).

In some embodiments, to filter the luma sample using the first filter in the video coding process at step 3402, in response to determining that the chroma sample is vertically shifted from the luma sample, the processor can filter the luma sample using a non-cross-shape filter. In response to determining that the chroma sample is not vertically shifted from the luma sample, the processor can filter the luma sample using the first filter. For example, the non-cross-shape filter can be an 8-tap hexagon-shape loop filter (e.g., filter 600 in FIG. 25A or FIG. 26A), and the first filter can be one of a 7-tap 5-3 cross-shape loop filter (e.g., filter 1700 in FIG. 25B) or an 8-tap 5×4 cross-shape loop filter (e.g., filter 700 in FIG. 26B).

Consistent with some embodiments of this disclosure, in process 3400, a shifting parameter value of the first filter can be the same as a shifting parameter value of the second filter. For example, the shifting parameter value of the first filter can be 10.

Consistent with some embodiments of this disclosure, in process 3400, the first filter can include N first clipping operation, and the second filter can include N second clipping operation. N is an integer greater than or equal to one. For example, N can be equal to one, in which the first filter includes a single first clipping operation, and the second filter includes a single second clipping operation. The first clipping operation can achieve that a coefficient filtered by the first filter can fall within a range of coded bit-depth. The second clipping operation can achieve that a coefficient filtered by the second filter can fall within a range of coded bit-depth.

Figure 35:
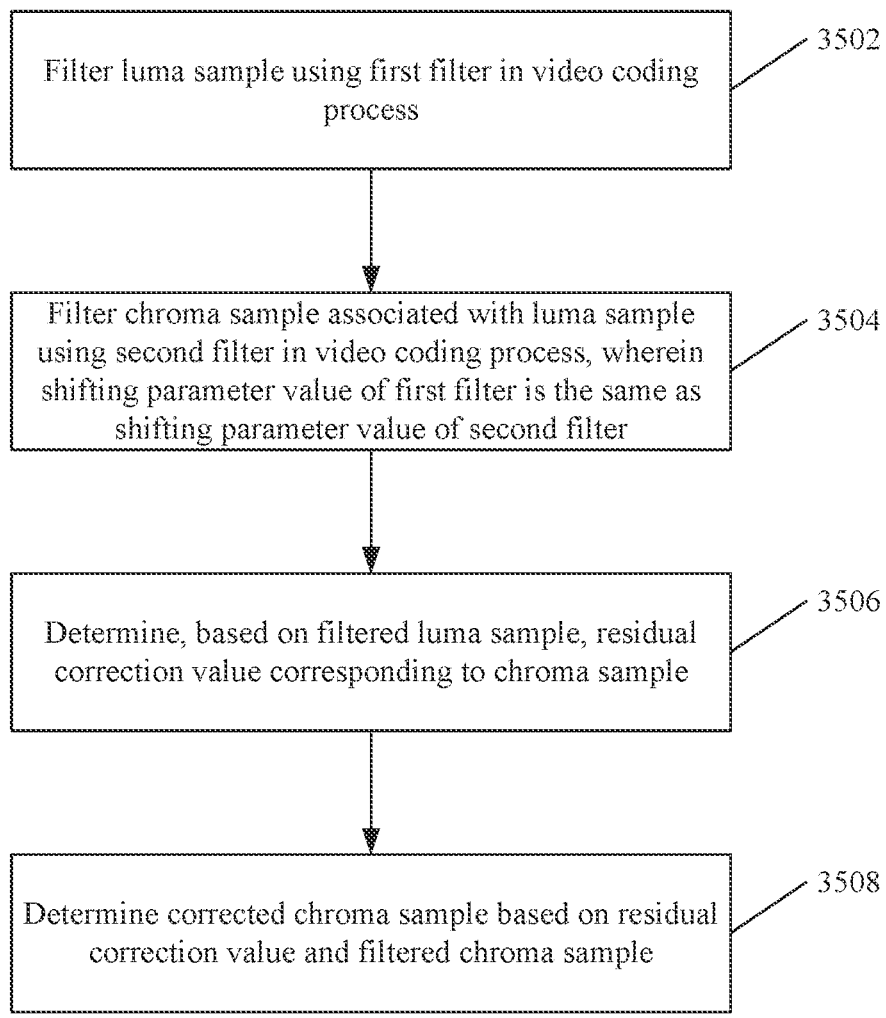
FIG. 35 illustrates a flowchart of another example process for video processing, consistent with some embodiments of this disclosure.

Consistent with some embodiments of this disclosure, FIG. 35 illustrates a flowchart of a process 3500 for video processing, consistent with some embodiments of this disclosure. In some embodiments, process 3500 can be performed by a codec (e.g., an encoder in FIGS. 2A-2B or a decoder in FIGS. 3A-3B). For example, the codec can be implemented as one or more software or hardware components of an apparatus (e.g., apparatus 400) for controlling a coding mode of encoding or decoding a video sequence, such as a processor (e.g., processor 402) of the apparatus.

At step 3502, a processor (e.g., processor 402 in FIG. 4) can filter a luma sample using a first filter in a video coding process. For example, the luma sample can be luma sample 602 in FIG. 6, luma sample 702 in FIG. 7, luma sample 902 in FIG. 9, luma sample 1302 in FIG. 13A, luma sample 1702 in FIG. 17, or luma sample 2102 in FIG. 21.

At step 3504, the processor can filter a chroma sample associated with the luma sample using a second filter in the video coding process. For example, the chroma sample can be chroma sample 604 in FIG. 6, chroma sample 704 in FIG. 7, chroma sample 904 in FIG. 9, chroma sample 1304 in FIG. 13A, chroma sample 1704 in FIG. 17, or chroma sample 2104 in FIG. 21. A shifting parameter value of the first filter is the same as a shifting parameter value of the second filter. In some embodiments, the shifting parameter value of the first filter can be 10.

In some embodiments, the first filter can be a cross component adaptive loop filter (CCALF), and the second filter can be an adaptive loop filter (ALF). In some embodiments, the first filter can include N first clipping operation, and the second filter can include N second clipping operation. N is an integer greater than or equal to one.

At step 3506, the processor can determine, based on the filtered luma sample, a residual correction value corresponding to the chroma sample. For example, if the chroma sample is a Cb sample or a Cr sample, the residual correction value can be the value "$\Delta I_1$" or "$\Delta I_2$" in FIG. 5, respectively.

At step 3508, the processor can determine a corrected chroma sample based on the residual correction value and the filtered chroma sample. In some embodiments, the processor can determine the corrected chroma sample by adding the residual correction value to the filtered chroma sample. For example, if the chroma sample is a Cb sample or a Cr sample, the corrected chroma sample can be the corrected Cb' sample or the corrected Cr' sample in FIG. 5, respectively.

Figure 36:
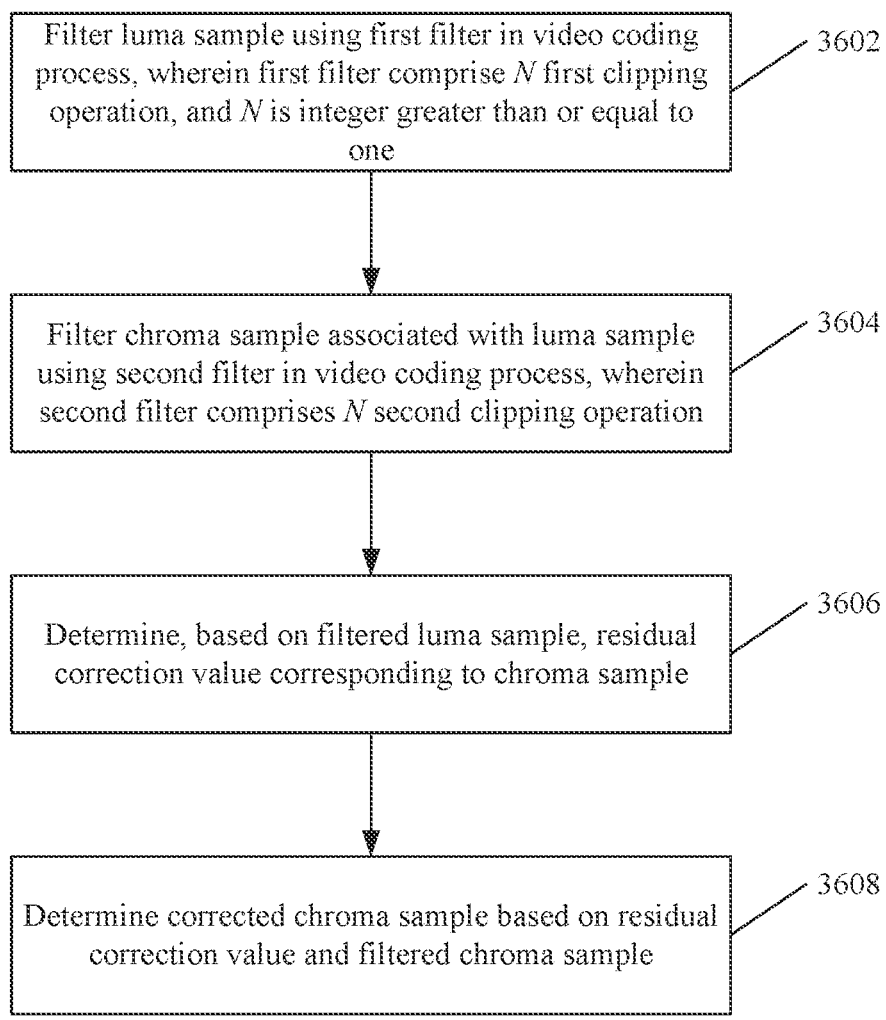
FIG. 36 illustrates a flowchart of another process for video processing, consistent with some embodiments of this disclosure.

Consistent with some embodiments of this disclosure, FIG. 36 illustrates a flowchart of a process 3600 for video processing, consistent with some embodiments of this disclosure. In some embodiments, process 3600 can be performed by a codec (e.g., an encoder in FIGS. 2A-2B or a decoder in FIGS. 3A-3B). For example, the codec can be implemented as one or more software or hardware components of an apparatus (e.g., apparatus 400) for controlling a coding mode of encoding or decoding a video sequence, such as a processor (e.g., processor 402) of the apparatus.

At step 3602, a processor (e.g., processor 402 in FIG. 4) can filter a luma sample using a first filter in a video coding process. The first filter can include N first clipping operation, and N is an integer greater than or equal to one. For example, the luma sample can be luma sample 602 in FIG. 6, luma sample 702 in FIG. 7, luma sample 902 in FIG. 9, luma sample 1302 in FIG. 13A, luma sample 1702 in FIG. 17, or luma sample 2102 in FIG. 21.

At step 3604, the processor can filter a chroma sample associated with the luma sample using a second filter in the video coding process. For example, the chroma sample can be chroma sample 604 in FIG. 6, chroma sample 704 in FIG. 7, chroma sample 904 in FIG. 9, chroma sample 1304 in FIG. 13A, chroma sample 1704 in FIG. 17, or chroma sample 2104 in FIG. 21. The second filter can include N second clipping operation. That is, the first filter and the second filter can include the same number of first clipping operations and second clipping operations, respectively. In some embodiments, N can be equal to one. In some embodiments, the first filter can be a cross component adaptive loop filter (CCALF), and the second filter can be an adaptive loop filter (ALF).

At step 3606, the processor can determine, based on the filtered luma sample, a residual correction value corresponding to the chroma sample. For example, if the chroma sample is a Cb sample or a Cr sample, the residual correction value can be the value "$\Delta I_1$" or "$\Delta I_2$" in FIG. 5, respectively.

At step 3608, the processor can determine a corrected chroma sample based on the residual correction value and the filtered chroma sample. In some embodiments, the processor can determine the corrected chroma sample by adding the residual correction value to the filtered chroma sample. For example, if the chroma sample is a Cb sample or a Cr sample, the corrected chroma sample can be the corrected Cb' sample or the corrected Cr' sample in FIG. 5, respectively.

In some embodiments, a non-transitory computer-readable storage medium including instructions is also provided, and the instructions can be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

The embodiments can further be described using the following clauses:

1. A non-transitory computer-readable medium storing a set of instructions that is executable by at least one processor of an apparatus to cause the apparatus to perform a method, the method comprising:
   filtering a luma sample using a first filter in a video coding process, the first filter being represented as a cross shape;
   filtering a chroma sample associated with the luma sample using a second filter in the video coding process;
   determining, based on the filtered luma sample, a residual correction value corresponding to the chroma sample; and
   determining a corrected chroma sample based on the residual correction value and the filtered chroma sample.

2. The non-transitory computer-readable medium of clause 1, wherein the first filter is one of an 8-tap 5×4 cross-shape loop filter, a 9-tap 5×5 cross-shape loop filter, a 13-tap 7-7 cross-shape loop filter, a 7-tap 5×3 cross-shape loop filter, a 7-tap 3×5 cross-shape loop filter, or a 17-tap 9×9 cross-shape loop filter.

3. The non-transitory computer-readable medium of clause 1, wherein the set of instructions that is executable by the at least one processor of the apparatus causes the apparatus to further perform:
   receiving a parameter from a parameter set associated with the luma sample;
   in response to the parameter having a first value, determining that the chroma sample is not vertically shifted from the luma sample; and
   in response to the parameter having a second value, determining that the chroma sample is vertically shifted from the luma sample for a distance.

4. The non-transitory computer-readable medium of clause 3, wherein filtering the luma sample using the first filter in the video coding process comprises:
   in response to determining that the chroma sample is vertically shifted from the luma sample, filtering the luma sample using a non-cross-shape filter; and
   in response to determining that the chroma sample is not vertically shifted from the luma sample, filtering the luma sample using the first filter.

5. The non-transitory computer-readable medium of clause 4, wherein the non-cross-shape filter is an 8-tap hexagon-shape loop filter, and the first filter is one of a 7-tap 5×3 cross-shape loop filter or an 8-tap 5.4 cross-shape loop filter.

6. The non-transitory computer-readable medium of clause 1, wherein a shifting parameter value of the first filter is the same as a shifting parameter value of the second filter.

7. The non-transitory computer-readable medium of clause 6, wherein the shifting parameter value of the first filter is 10.

8. The non-transitory computer-readable medium of clause 6, wherein the first filter comprises N first clipping operation, the second filter comprises N second clipping operation, and N is an integer greater than or equal to one.

9. The non-transitory computer-readable medium of clause 1, wherein the first filter comprises N first clipping operation, the second filter comprises N second clipping operation, and N is an integer greater than or equal to one.

10. The non-transitory computer-readable medium of clause 9, wherein N is equal to one.

11. The non-transitory computer-readable medium of any of clauses 1-10, wherein the first filter is a cross component adaptive loop filter (CCALF), and the second filter is an adaptive loop filter (ALF).

12. A non-transitory computer-readable medium storing a set of instructions that is executable by at least one processor of an apparatus to cause the apparatus to perform a method, the method comprising:
   filtering a luma sample using a first filter in a video coding process;
   filtering a chroma sample associated with the luma sample using a second filter in the video coding process, wherein a shifting parameter value of the first filter is the same as a shifting parameter value of the second filter;
   determining, based on the filtered luma sample, a residual correction value corresponding to the chroma sample; and
   determining a corrected chroma sample based on the residual correction value and the filtered chroma sample.

13. The non-transitory computer-readable medium of clause 12, wherein the shifting parameter value of the first filter is 10.

14. The non-transitory computer-readable medium of clause 12, wherein the first filter comprises N first clipping operation, the second filter comprises N second clipping operation, and N is an integer greater than or equal to one.

15. The non-transitory computer-readable medium of any of clauses 12-14, wherein the first filter is a cross component adaptive loop filter (CCALF), and the second filter is an adaptive loop filter (ALF).

16. A non-transitory computer-readable medium storing a set of instructions that is executable by at least one processor of an apparatus to cause the apparatus to perform a method, the method comprising:
filtering a luma sample using a first filter in a video coding process, wherein the first filter comprises N first clipping operation, and N is an integer greater than or equal to one;
filtering a chroma sample associated with the luma sample using a second filter in the video coding process, wherein the second filter comprises N second clipping operation;
determining, based on the filtered luma sample, a residual correction value corresponding to the chroma sample; and
determining a corrected chroma sample based on the residual correction value and the filtered chroma sample.

17. The non-transitory computer-readable medium of clause 16, wherein N is equal to one.

18. The non-transitory computer-readable medium of any of clauses 16-17, wherein the first filter is a cross component adaptive loop filter (CCALF), and the second filter is an adaptive loop filter (ALF).

19. An apparatus, comprising:
a memory configured to store a set of instructions; and
one or more processors communicatively coupled to the memory and configured to execute the set of instructions to cause the apparatus to perform:
filtering a luma sample using a first filter in a video coding process, the first filter being represented as a cross shape;
filtering a chroma sample associated with the luma sample using a second filter in the video coding process;
determining, based on the filtered luma sample, a residual correction value corresponding to the chroma sample; and
determining a corrected chroma sample based on the residual correction value and the filtered chroma sample.

20. The apparatus of clause 19, wherein the first filter is one of an 8-tap 5×4 cross-shape loop filter, a 9-tap 5×5 cross-shape loop filter, a 13-tap 7×7 cross-shape loop filter, a 7-tap 5-3 cross-shape loop filter, a 7-tap 3×5 cross-shape loop filter, or a 17-tap 9×9 cross-shape loop filter.

21. The apparatus of clause 19, wherein the one or more processors are further configured to execute the set of instructions to cause the apparatus to perform:
receiving a parameter from a parameter set associated with the luma sample;
in response to the parameter having a first value, determining that the chroma sample is not vertically shifted from the luma sample; and
in response to the parameter having a second value, determining that the chroma sample is vertically shifted from the luma sample for a distance.

22. The apparatus of clause 21, wherein filtering the luma sample using the first filter in the video coding process comprises:
in response to determining that the chroma sample is vertically shifted from the luma sample, filtering the luma sample using a non-cross-shape filter; and
in response to determining that the chroma sample is not vertically shifted from the luma sample, filtering the luma sample using the first filter.

23. The apparatus of clause 22, wherein the non-cross-shape filter is an 8-tap hexagon-shape loop filter, and the first filter is one of a 7-tap 5×3 cross-shape loop filter or an 8-tap 5×4 cross-shape loop filter.

24. The apparatus of clause 19, wherein a shifting parameter value of the first filter is the same as a shifting parameter value of the second filter.

25. The apparatus of clause 24, wherein the shifting parameter value of the first filter is 10.

26. The apparatus of clause 24, wherein the first filter comprises N first clipping operation, the second filter comprises N second clipping operation, and N is an integer greater than or equal to one.

27. The apparatus of clause 19, wherein the first filter comprises N first clipping operation, the second filter comprises N second clipping operation, and N is an integer greater than or equal to one.

28. The apparatus of clause 27, wherein N is equal to one.

29. The apparatus of any of clauses 19-28, wherein the first filter is a cross component adaptive loop filter (CCALF), and the second filter is an adaptive loop filter (ALF).

30. An apparatus, comprising:
a memory configured to store a set of instructions; and
one or more processors communicatively coupled to the memory and configured to execute the set of instructions to cause the apparatus to perform:
filtering a luma sample using a first filter in a video coding process;
filtering a chroma sample associated with the luma sample using a second filter in the video coding process, wherein a shifting parameter value of the first filter is the same as a shifting parameter value of the second filter;
determining, based on the filtered luma sample, a residual correction value corresponding to the chroma sample; and
determining a corrected chroma sample based on the residual correction value and the filtered chroma sample.

31. The apparatus of clause 30, wherein the shifting parameter value of the first filter is 10.

32. The apparatus of clause 30, wherein the first filter comprises N first clipping operation, the second filter comprises N second clipping operation, and N is an integer greater than or equal to one.

33. The apparatus of any of clauses 30-32, wherein the first filter is a cross component adaptive loop filter (CCALF), and the second filter is an adaptive loop filter (ALF).

34. An apparatus, comprising:
a memory configured to store a set of instructions; and
one or more processors communicatively coupled to the memory and configured to execute the set of instructions to cause the apparatus to perform:
filtering a luma sample using a first filter in a video coding process, wherein the first filter comprises N first clipping operation, and N is an integer greater than or equal to one;
filtering a chroma sample associated with the luma sample using a second filter in the video coding process, wherein the second filter comprises N second clipping operation;
determining, based on the filtered luma sample, a residual correction value corresponding to the chroma sample; and
determining a corrected chroma sample based on the residual correction value and the filtered chroma sample.

35. The apparatus of clause 34, wherein N is equal to one.

36. The apparatus of any of clauses 34-35, wherein the first filter is a cross component adaptive loop filter (CCALF), and the second filter is an adaptive loop filter (ALF).

37. A computer-implemented method, comprising:
filtering a luma sample using a first filter in a video coding process, the first filter being represented as a cross shape;
filtering a chroma sample associated with the luma sample using a second filter in the video coding process;
determining, based on the filtered luma sample, a residual correction value corresponding to the chroma sample; and
determining a corrected chroma sample based on the residual correction value and the filtered chroma sample.

38. The computer-implemented method of clause 37, wherein the first filter is one of an 8-tap 5×4 cross-shape loop filter, a 9-tap 5×5 cross-shape loop filter, a 13-tap 7×7 cross-shape loop filter, a 7-tap 5-3 cross-shape loop filter, a 7-tap 3×5 cross-shape loop filter, or a 17-tap 9×9 cross-shape loop filter.

39. The computer-implemented method of clause 37, further comprising:
receiving a parameter from a parameter set associated with the luma sample;
in response to the parameter having a first value, determining that the chroma sample is not vertically shifted from the luma sample; or
in response to the parameter having a second value, determining that the chroma sample is vertically shifted from the luma sample for a distance.

40. The computer-implemented method of clause 39, wherein filtering the luma sample using the first filter in the video coding process comprises:
in response to determining that the chroma sample is vertically shifted from the luma sample, filtering the luma sample using a non-cross-shape filter; or
in response to determining that the chroma sample is not vertically shifted from the luma sample, filtering the luma sample using the first filter.

41. The computer-implemented method of clause 22, wherein the non-cross-shape filter is an 8-tap hexagon-shape loop filter, and the first filter is one of a 7-tap 5×3 cross-shape loop filter or an 8-tap 5×4 cross-shape loop filter.

42. The computer-implemented method of clause 37, wherein a shifting parameter value of the first filter is the same as a shifting parameter value of the second filter.

43. The computer-implemented method of clause 42, wherein the shifting parameter value of the first filter is 10.

44. The computer-implemented method of clause 42, wherein the first filter comprises N first clipping operation, the second filter comprises N second clipping operation, and N is an integer greater than or equal to one.

45. The computer-implemented method of clause 37, wherein the first filter comprises N first clipping operation, the second filter comprises N second clipping operation, and N is an integer greater than or equal to one.

46. The computer-implemented method of clause 45, wherein N is equal to one.

47. The computer-implemented method of any of clauses 37-46, wherein the first filter is a cross component adaptive loop filter (CCALF), and the second filter is an adaptive loop filter (ALF).

48. A computer-implemented method, comprising:
filtering a luma sample using a first filter in a video coding process;
filtering a chroma sample associated with the luma sample using a second filter in the video coding process, wherein a shifting parameter value of the first filter is the same as a shifting parameter value of the second filter;
determining, based on the filtered luma sample, a residual correction value corresponding to the chroma sample; and
determining a corrected chroma sample based on the residual correction value and the filtered chroma sample.

49. The computer-implemented method of clause 48, wherein the shifting parameter value of the first filter is 10.

50. The computer-implemented method of clause 48, wherein the first filter comprises N first clipping operation, the second filter comprises N second clipping operation, and N is an integer greater than or equal to one.

51. The computer-implemented method of any of clauses 48-50, wherein the first filter is a cross component adaptive loop filter (CCALF), and the second filter is an adaptive loop filter (ALF).

52. A computer-implemented method, comprising:
filtering a luma sample using a first filter in a video coding process, wherein the first filter comprises N first clipping operation, and N is an integer greater than or equal to one;
filtering a chroma sample associated with the luma sample using a second filter in the video coding process, wherein the second filter comprises N second clipping operation;
determining, based on the filtered luma sample, a residual correction value corresponding to the chroma sample; and
determining a corrected chroma sample based on the residual correction value and the filtered chroma sample.

53. The computer-implemented method of clause 52, wherein N is equal to one.

54. The computer-implemented method of any of clauses 52-53, wherein the first filter is a cross component adaptive loop filter (CCALF), and the second filter is an adaptive loop filter (ALF).

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art can also understand that multiple ones of the above described modules/units can be combined as one module/unit, and each of the above described modules/units can be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as example only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed example embodiments. However, many variations and modifications can be made to these embodiments. Accordingly, although specific terms are employed, they are used in a generic and descriptive sense only and not for purposes of limitation.

What is claimed is:

1. A non-transitory computer-readable medium storing a set of instructions that is executable by at least one processor of an apparatus to cause the apparatus to perform a method, the method comprising:
    filtering a luma sample using a first filter in a video coding process, wherein the first filter is an N-tap X×Y cross-shape loop filter, wherein N, X, and Y are integers, and the first filter has a total of N-taps where N=X+Y−1;
    filtering a chroma sample associated with the luma sample using a second filter in the video coding process;
    determining, based on the filtered luma sample, a residual correction value corresponding to the chroma sample; and
    determining a corrected chroma sample based on the residual correction value and the filtered chroma sample.

2. The non-transitory computer-readable medium of claim 1, wherein the first filter is one of an 8-tap 5×4 cross-shape loop filter, a 9-tap 5×5 cross-shape loop filter, a 13-tap 7×7 cross-shape loop filter, a 7-tap 5×3 cross-shape loop filter, a 7-tap 3×5 cross-shape loop filter, or a 17-tap 9×9 cross-shape loop filter.

3. The non-transitory computer-readable medium of claim 1, wherein the set of instructions that is executable by the at least one processor of the apparatus causes the apparatus to further perform:
    receiving a parameter from a parameter set associated with the luma sample;
    in response to the parameter having a first value, determining that the chroma sample is not vertically shifted from the luma sample; and
    in response to the parameter having a second value, determining that the chroma sample is vertically shifted from the luma sample for a distance.

4. The non-transitory computer-readable medium of claim 3, wherein filtering the luma sample using the first filter in the video coding process comprises:
    in response to determining that the chroma sample is vertically shifted from the luma sample, filtering the luma sample using a non-cross-shape filter; and
    in response to determining that the chroma sample is not vertically shifted from the luma sample, filtering the luma sample using the first filter.

5. The non-transitory computer-readable medium of claim 4, wherein the non-cross-shape filter is an 8-tap hexagon-shape loop filter, and the first filter is one of a 7-tap 5×3 cross-shape loop filter or an 8-tap 5×4 cross-shape loop filter.

6. The non-transitory computer-readable medium of claim 1, wherein a shifting parameter value of the first filter is the same as a shifting parameter value of the second filter.

7. The non-transitory computer-readable medium of claim 6, wherein the shifting parameter value of the first filter is 10.

8. The non-transitory computer-readable medium of claim 6, wherein the first filter comprises N first clipping operation, the second filter comprises N second clipping operation, and N is an integer greater than or equal to one.

9. The non-transitory computer-readable medium of claim 1, wherein the first filter comprises N first clipping operation, the second filter comprises N second clipping operation, and N is an integer greater than or equal to one.

10. The non-transitory computer-readable medium of claim 9, wherein N is equal to one.

11. The non-transitory computer-readable medium of claim 1, wherein the first filter is a cross component adaptive loop filter (CCALF), and the second filter is an adaptive loop filter (ALF).

12. An apparatus, comprising:
    a memory configured to store a set of instructions; and
    one or more processors communicatively coupled to the memory and configured to execute the set of instructions to cause the apparatus to perform:
    filtering a luma sample using a first filter in a video coding process, wherein the first filter is an N-tap X×Y cross-shape loop filter,
    wherein N, X, and Y are integers, and the first filter has a total of N-taps where N=X+Y−1;
    filtering a chroma sample associated with the luma sample using a second filter in the video coding process;
    determining, based on the filtered luma sample, a residual correction value corresponding to the chroma sample; and
    determining a corrected chroma sample based on the residual correction value and the filtered chroma sample.

13. The apparatus of claim 12, wherein the first filter is one of an 8-tap 5×4 cross-shape loop filter, a 9-tap 5×5 cross-shape loop filter, a 13-tap 7×7 cross-shape loop filter, a 7-tap 5×3 cross-shape loop filter, a 7-tap 3×5 cross-shape loop filter, or a 17-tap 9×9 cross-shape loop filter.

14. The apparatus of claim 12, wherein the one or more processors are further configured to execute the set of instructions to cause the apparatus to perform:
    receiving a parameter from a parameter set associated with the luma sample;
    in response to the parameter having a first value, determining that the chroma sample is not vertically shifted from the luma sample; and
    in response to the parameter having a second value, determining that the chroma sample is vertically shifted from the luma sample for a distance.

15. The apparatus of claim 14, wherein filtering the luma sample using the first filter in the video coding process comprises:
    in response to determining that the chroma sample is vertically shifted from the luma sample, filtering the luma sample using a non-cross-shape filter; and
    in response to determining that the chroma sample is not vertically shifted from the luma sample, filtering the luma sample using the first filter.

16. The apparatus of claim 15, wherein the non-cross-shape filter is an 8-tap hexagon-shape loop filter, and the first filter is one of a 7-tap 5×3 cross-shape loop filter or an 8-tap 5×4 cross-shape loop filter.

17. The apparatus of claim 12, wherein a shifting parameter value of the first filter is the same as a shifting parameter value of the second filter.

18. The apparatus of claim 17, wherein the first filter comprises N first clipping operation, the second filter comprises N second clipping operation, and N is an integer greater than or equal to one.

19. The apparatus of claim 12, wherein the first filter comprises N first clipping operation, the second filter comprises N second clipping operation, and N is an integer greater than or equal to one.

20. A computer-implemented method, comprising:
    filtering a luma sample using a first filter in a video coding process, wherein the first filter is an N-tap X×Y cross-shape loop filter, wherein N, X, and Y are integers, and the first filter has a total of N-taps where N=X+Y−1;

filtering a chroma sample associated with the luma sample using a second filter in the video coding process;

determining, based on the filtered luma sample, a residual correction value corresponding to the chroma sample; and determining a corrected chroma sample based on the residual correction value and the filtered chroma sample.

* * * * *